(12) United States Patent
Miyamoto et al.

(10) Patent No.: US 6,815,509 B2
(45) Date of Patent: Nov. 9, 2004

(54) METHOD FOR HYDROGENATION OF POLYMER

(75) Inventors: Koichi Miyamoto, Tokyo (JP); Yasumasa Yamakoshi, Tokyo (JP); Toshinori Shiraki, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 65 days.

(21) Appl. No.: 10/049,866

(22) PCT Filed: Jun. 26, 2001

(86) PCT No.: PCT/JP01/05434

§ 371 (c)(1),
(2), (4) Date: Feb. 19, 2002

(87) PCT Pub. No.: WO02/02650

PCT Pub. Date: Jan. 10, 2002

(65) Prior Publication Data

US 2002/0107423 A1 Aug. 8, 2002

(30) Foreign Application Priority Data

Jun. 30, 2000 (JP) ........................................ 2000-199037

(51) Int. Cl.[7] .................................................. C08F 8/04
(52) U.S. Cl. .................... 525/338; 525/339; 525/332.8; 525/332.9; 525/333.1; 525/333.2
(58) Field of Search .................................. 525/338, 339

(56) References Cited

U.S. PATENT DOCUMENTS

| | | | |
|---|---|---|---|
| 3,743,677 A | | 7/1973 | Grosskinsky et al. |
| 3,823,172 A | | 7/1974 | Leuteritz |
| 3,847,989 A | | 11/1974 | Platz et al. |
| 3,937,759 A | * | 2/1976 | Baumgartner et al. ...... 525/338 |
| 3,988,329 A | | 10/1976 | Zucker |
| 4,049,893 A | * | 9/1977 | Kidwell, Jr. ................. 585/18 |
| 4,471,099 A | * | 9/1984 | Trepka ........................ 525/338 |
| 4,629,766 A | * | 12/1986 | Malatesta et al. ........... 525/222 |
| 4,629,767 A | * | 12/1986 | Shyr et al. ................... 525/339 |
| 5,300,708 A | | 4/1994 | Hofs et al. |
| 5,852,130 A | * | 12/1998 | Mussmann et al. ......... 525/338 |
| 5,886,108 A | | 3/1999 | Miyamoto et al. |
| 5,914,432 A | | 6/1999 | Lume-Pereira |
| 6,395,841 B1 | * | 5/2002 | Calverley et al. ........... 525/338 |
| 6,433,104 B1 | * | 8/2002 | Macedo et al. .............. 525/338 |

FOREIGN PATENT DOCUMENTS

| | | |
|---|---|---|
| DE | 197 19 431 A1 | 11/1998 |
| JP | 50-9762 | 4/1975 |
| JP | 50-96471 | 7/1975 |
| JP | 61-28507 A | 2/1986 |
| JP | 61-33132 A | 2/1986 |
| JP | 61-47706 A | 3/1986 |
| JP | 62-151405 A | 7/1987 |
| JP | 62-209103 A | 9/1987 |
| JP | 63-83031 A | 4/1988 |
| JP | 2-51502 A | 2/1990 |
| JP | 8-19006 B2 | 2/1996 |
| JP | 8-109219 A | 4/1996 |
| JP | 8-143479 A | 6/1996 |
| JP | 10-316592 A | 12/1998 |
| JP | 11-71426 A | 3/1999 |
| JP | 11-286513 A | 10/1999 |
| JP | 2000-95814 A | 4/2000 |
| WO | WO 96/16922 | 6/1996 |

\* cited by examiner

Primary Examiner—Bernard Lipman
(74) Attorney, Agent, or Firm—Birch, Stewart, Kolasch & Birch, LLP

(57) ABSTRACT

A process for hydrogenating a polymer, which process comprises contacting a polymer containing an olefinic unsaturated group with hydrogen in the presence of a hydrogenation catalyst to hydrogenate the olefinic unsaturated group of the polymer, and recycling at least one part of the hydrogenated polymer for hydrogenation. According to the process of the present invention, there can be provided a polymer having a desirable degree of hydrogenation steadily for a long period.

20 Claims, 6 Drawing Sheets

METHOD FOR HYDROGENATION OF POLYMER

This application is the national phase under 35 U.S.C. §371 of PCT International Application No. PCT/JP01/05434 which has an International filing date of Jun. 26, 2001, which designated the United States of America.

TECHNICAL FIELD

The present invention relates to a process for hydrogenating olefinic unsaturated groups by contacting a solution of polymers containing the olefinic unsaturated groups with hydrogen in the presence of a hydrogenation catalyst. More specifically, the present invention relates to a process for hydrogenating a polymer wherein at least one part of a hydrogenated polymer solution is recycled and hydrogenated in the above-mentioned process.

BACKGROUND ART

A polymer containing olefinic unsaturated groups has disadvantages of being inferior in stability, such as heat resistance and oxidation resistance due to olefinic unsaturated groups, while the olefinic unsaturated groups are advantageously used for the vulcanization or the like. These disadvantages are remarkably improved by hydrogenating olefinic unsaturated groups in polymer chains.

The present applicant has already taught hydrogenation processes using metallocene type catalysts in Japanese Patent Application Laid-Open Nos. 61-28507, 61-33132, 61-47706 and 62-209103, Japanese Patent Publication Nos. 63-5402 and 1-53851, and the like. These inventions relate to a batch hydrogenation process. However, metallocene type catalysts are not only expensive but also have disadvantages of being easily inactivated by the rise of temperature caused by the heat of the hydrogenation reaction or the like. Owing to these disadvantages, the catalysts have been used in an amount more than necessary or hydrogenation reaction periods have become long. As a result, problems in production costs have been caused.

On the other hand, Japanese Patent Application Laid-Open No. 8-109219 discloses a production process of a hydrogenated polymer having an excellent weather resistance wherein a polymer solution containing olefinic unsaturated groups, hydrogen gas, and a hydrogenation catalyst are continuously supplied to a tank reactor equipped with a stirrer and the reaction product is continuously taken out. Japanese Patent Application Laid-Open No. 11-286513 discloses a continuous production process of a hydrogenated polymer containing olefinic unsaturated groups wherein plural reactors are connected in series and hydrogen is supplied to at least one of the reactors from the lower portion thereof.

However, according to these processes, it has been difficult to maintain and control a desirable degree of hydrogenation in the case of a long-term continuous operation. Particularly, in the case of production of a highly hydrogenated polymer, a polymer having a lower degree of hydrogenation than aimed has been disadvantageously obtained, or the hydrogenation reaction has had to be restarted after the continuous hydrogenation reaction is once stopped to adjust the hydrogenation condition when the hydrogenation reaction is not performed properly. Additionally, in the case of these continuous hydrogenation processes, the amount of catalysts used have disadvantageously increased though productivity has been higher than a batch hydrogenation process.

Therefore, it has been strongly desired to develop methods for overcoming these problems.

DISCLOSURE OF THE INVENTION

An object of the present invention is to provide a process for hydrogenating a polymer containing an olefinic unsaturated group which can steadily maintain or control a desirable degree of hydrogenation for a long term.

The present inventors have studied the above-mentioned problems extensively and intensively. As a result, the inventors have found that the above-mentioned problems can be solved by recycling one part of a hydrogenated polymer solution to the reactor, and thus accomplished the present invention.

Namely, the present invention is:

(1) A process for hydrogenating a polymer, which process comprises the steps of:

contacting a polymer solution containing an olefinic unsaturated group with hydrogen in the presence of a hydrogenation catalyst to hydrogenate the olefinic unsaturated group of the polymer; and recycling at least one part of the resultant hydrogenated polymer solution for hydrogenation.

The present invention also covers the following preferred embodiments.

(2) The process according to the above-mentioned process (1), wherein the polymer solution containing an olefinic unsaturated group is continuously supplied to a reactor to continuously hydrogenate the olefinic unsaturated group of the polymer, and the resultant hydrogenated polymer solution is continuously taken out from the reactor and then one part thereof is continuously recycled to the reactor for hydrogenation.

(3) The process according to the above-mentioned process (2), wherein the hydrogen is supplied from near the bottom of the reactor.

(4) The process according to the above-mentioned process (2) or (3), wherein the reactor is a tank reactor, the polymer solution containing an olefinic unsaturated group is supplied from near the top of the reactor, and the resultant hydrogenated polymer solution is taken out from near the bottom of the reactor or a piping arranged out of the reactor to recycle one part thereof to the reactor for hydrogenation.

(5) The process according to any one of the above-mentioned processes (2) through (4), wherein the reactor is a tank reactor having an L/D of from 1 to 8 and being equipped with a stirrer, wherein L represents a length between an upper tangent line and a lower tangent line of the reactor and D represents an inner diameter of the reactor.

(6) The process according to the above-mentioned process (2) or (3), wherein the reactor is a column or tube reactor, the polymer solution containing an olefinic unsaturated group is supplied from near the bottom of the reactor, and one part of the polymer solution hydrogenated in the reactor is continuously taken out from near the top of the reactor or a piping arranged out of the reactor to recycle one part thereof to the reactor.

(7) The process according to any one of the above-mentioned processes (1) through (6), wherein the hydrogenation catalyst is supplied two or more times to conduct hydrogenation.

(8) The process according to the above-mentioned process (1), wherein a reactor group comprising two or more reactors connected in series is used, the polymer solution containing an olefinic unsaturated group is continuously supplied to the first reactor of the reactor group, the hydrogen is supplied to at least one reactor of the reactor group to continuously hydrogenate the olefinic unsaturated group of the polymer, and the resultant polymer solution hydrogenated in at least one reactor of the reactor group is continuously taken out to continuously recycle one part thereof to the reactor and/or a reactor arranged upstream of the reactor for hydrogenation.

(9) The process according to the above-mentioned process (8), wherein the hydrogen is supplied from near the bottom of at least one reactor of the reactor group.

(10) The process according to the above-mentioned process (8) or (9), wherein the first reactor is a tank reactor having an L/D of from 1 to 8 and being equipped with a stirrer, and the second and following reactors arranged downstream of the first reactor are at least one kind selected from the group consisting of a tank reactor having an L/D of from 1 to 8 and being equipped with a stirrer, a column reactor having an L/D of 2 or more and a tube reactor having an L/D of 2 or more.

(11) The process according to any one of the above-mentioned processes (8) through (10), wherein at least one reactor is a tank reactor, the polymer solution containing an olefinic unsaturated group is supplied to the reactor from near the top thereof, and one part of the resultant polymer solution hydrogenated therein is continuously taken out from near the bottom of the reactor or a piping arranged out of the reactor and then is recycled to the reactor or a reactor arranged upstream of the reactor.

(12) The process according to any one of the above-mentioned processes (8) through (10), wherein at least one reactor is a column or tube reactor, the polymer solution containing an olefinic unsaturated group is supplied to the reactor from near the bottom thereof, and one part of the resultant polymer solution hydrogenated in the reactor is continuously taken out from near the top of the reactor or a piping arranged out of the reactor and then is recycled to the reactor or a reactor arranged upstream of the reactor.

(13) The process according to any one of the above-mentioned processes (8) through (12), wherein the hydrogenation catalyst solution is supplied to the first reactor and is additionally supplied to at least one of the reactors arranged downstream of the first reactor.

(14) The process according to any one of the above-mentioned processes (2) through (13), wherein the continuous hydrogenation is initiated after the polymer solution containing an olefinic unsaturated group is hydrogenated to a desirable degree of hydrogenation.

(15) The process according to any one of the above-mentioned processes (1) through (14), wherein the mass ratio between the polymer containing an olefinic unsaturated group to be supplied to the reactor and the resultant hydrogenated polymer to be recycled is from 1/50 to 50/1.

(16) The process according to the above-mentioned process (1), wherein the hydrogenation reaction is a batch type.

(17) The process according to the above-mentioned process (16), wherein the hydrogenation catalyst is supplied two or more times.

(18) The process according to the above-mentioned process (17), wherein timing of the second and following supply of the hydrogenation catalyst is determined by measuring an absorption rate of hydrogen.

(19) The process according to the above-mentioned process (18), wherein timing of the second and following supply of the hydrogenation catalyst is at a time when the absorption rate of hydrogen decreases to 80% or less of an initial absorption rate of hydrogen at the beginning of the hydrogenation reaction.

(20) The process according to the above-mentioned process (17), wherein an amount of the first supply of hydrogenation catalyst is controlled so that a degree of hydrogenation at the time of the second and following supply is from 50% to 90%.

(21) The process according to any one of the above-mentioned processes (1) through (20), wherein the resultant hydrogenated polymer solution is recycled through a heat exchanger.

(22) The process according to any one of the above-mentioned processes (1) through (21), wherein the hydrogenation catalyst is a metallocene compound.

BEST MODE FOR CARRYING OUT THE INVENTION

Figure 1:
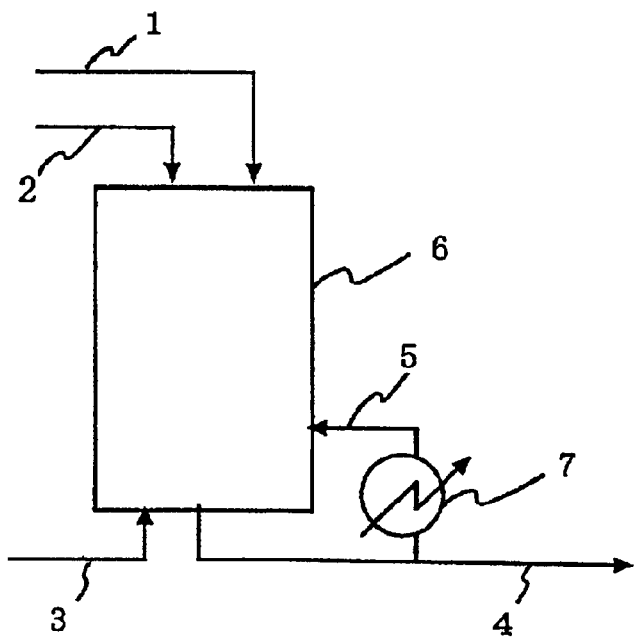
FIG. 1 shows a schematic flow of one example of the present invention (Example 1).

The present invention is a process for hydrogenating a polymer wherein a polymer solution containing an olefinic unsaturated group is contacted with hydrogen in the presence of a hydrogenation catalyst to hydrogenate the olefinic unsaturated group of the polymer, and is characterized in that at least one part of a resultant hydrogenated polymer solution is recycled and hydrogenated in the hydrogenation process. Heretofore, it has not been known that, by recycling at least one part of a polymer, which is partially hydrogenated but still contains olefinic unsaturated groups, to a zone where a polymer having a lower degree of hydrogenation than the polymer to be recycled is hydrogenated to perform a hydrogenation reaction of both of the polymers as proposed in the present invention, a hydrogenation reaction steadily proceeds so that a hydrogenated polymer having a desirable degree of hydrogenation is obtainable.

The inventors have made studies focusing on the fact that, in a hydrogenation reaction of a polymer solution containing an olefinic unsaturated group, the polymer solution is difficult to mix or contact with hydrogen because of its high viscosity and the reaction is hard to proceed compared with that of a monomer. As a result, the inventors have found that the stirring effect can be improved by recycling one part of a polymer, which is partially hydrogenated but still contains olefinic unsaturated groups, to hydrogenate and succeeded in performing the hydrogenation reaction steadily. Moreover, the present inventors have also found that a catalyst is deactivated not only by rise in temperature but by decrease of unhydrogenated double-bonds in a reaction system in the case of hydrogenation using a metallocene catalyst, and successfully achieved a stable hydrogenation reaction by returning the polymer solution having double-bonds to the reaction system to increase the double-bonds therein and prevent the catalyst from being deactivated.

The process of the present invention includes a batch hydrogenation process, in which only a polymer solution containing an olefinic unsaturated group which is supplied to a reactor in advance is hydrogenated and taken out from the system after a degree of hydrogenation reaches a desirable level, and a continuous hydrogenation process, in which a polymer solution containing an olefinic unsaturated group is continuously supplied and the hydrogenated polymer solution is continuously taken out. Of these, a continuous hydrogenation process is preferred in that the reaction and a reaction temperature can be easily controlled by adjusting the supply speed of the polymer solution.

The hydrogenation process of the present invention may be conducted by using one reactor or two or more reactors.

In the case of using one reactor, it is preferred that a polymer solution containing an olefinic unsaturated group is supplied to the reactor from near the top thereof, and hydrogen is supplied to the reactor at near the bottom thereof or a recycle line for the polymer solution, and the resultant hydrogenated polymer solution is continuously taken out from near the bottom of the reactor or a piping arranged out of the reactor and then recycled to the reactor to hydrogenate. In the present invention, the phrases "near the top" and "near the bottom" indicate the top and a position close to the top of a reactor, and the bottom and a position close to the bottom of a reactor, respectively. A position to which a hydrogenated polymer solution is recycled is preferably above the lower tangent line of a reactor, more preferably above the lower tangent line of a reactor by L/10 or more. Herein, L represents a length between the upper tangent line and the lower tangent line of a reactor (the same applied to the below).

In the process of the present invention, two or more reactors can be also used by connecting them in series. In this case, a polymer solution hydrogenated in at least one of the reactors connected in series is recycled to the reactor and/or a reactor arranged upstream of the reactor to hydrogenate. Particularly, recycling is preferably performed according to any one of the following manners comprising:
1) recycling the polymer solution hydrogenated in the first reactor to the first reactor,
2) recycling the polymer solution hydrogenated in the second reactor to the first and/or second reactor(s), and
3) conducting 1) and 2) in combination.

When a polymer solution to be hydrogenated is supplied to a reactor from near the top thereof, it is preferred that a polymer solution to be recycled is continuously taken out from near the bottom of the reactor or a piping arranged out of the reactor and recycled to the reactor or another reactor. Such a recycling method is suitable for the case where the reactor is a tank, column or tube reactor. In this recycling method, when the solution is recycled to the same reactor as the one from which it is taken out, the hydrogenated polymer solution is preferably recycled to a position above the lower tangent line of the reactor, particularly a position above the lower tangent line of the reactor by L/10 or more. In the case of recycling to another reactor, the position is not particularly limited.

When a polymer solution to be hydrogenated is supplied to a reactor from near the bottom thereof, it is preferred that a polymer solution to be recycled is continuously taken out from near the top of the reactor or a piping arranged out of the reactor and recycled to the reactor or another reactor. Such a recycling method is suitable for the case where the reactor is a column or tube reactor. In this recycling method, when the solution is recycled to the same reactor as the one from which it is taken out, the hydrogenated polymer solution is preferably recycled to a position below the upper tangent line of the reactor, particularly a position below the upper tangent line by L/10 or more. In the case of recycling to another reactor, the position is not particularly limited.

The amount of a polymer solution to be recycled is not particularly limited in the present invention. A hydrogenated polymer solution being taken out from the reactor may be recycled in the whole amount or one part thereof. In the case of continuous hydrogenation, a hydrogenated polymer solution being taken out from a reactor is preferably recycled in an amount of from 1/51 to 50/51 (mass ratio). In the case of batch hydrogenation, the whole amount of a hydrogenated polymer solution is preferably recycled.

The ratio (mass ratio) of a polymer, which is recycled from a reactor (origin of recycling) to the reactor or another reactor (destination of recycling), to a polymer containing an olefinic unsaturated group, which is supplied to a reactor (origin of recycling) to hydrogenate, is preferably 1/50 or more, more preferably 1/30 or more, most preferably 1/25 or more from the viewpoint of stability of a hydrogenation reaction or a degree of hydrogenation of the obtained polymer, and is preferably 50/1 or less, more preferably 30/1 or less, most preferably 25/1 or less from the viewpoint of commercial productivity. This mass ratio is adjustable by changing the amount of a polymer solution to be recycled or the amount of a polymer solution to be supplied to the hydrogenation reactor.

The degree of hydrogenation of a polymer to be recycled is preferably 3% or more and less than 100%, more preferably from 5 to 99.5%, most preferably from 10 to 99%. Here, the degree of hydrogenation can be measured by the methods described below.

In the present invention, a polymer solution to be recycled may be recycled through a piping equipped with a heat exchanger to control a reaction temperature in a reactor to which the polymer solution to be recycled is supplied. This process is effective for the case where a hydrogenation temperature is difficult to control by a jacket or an internal cooling coil, and also for the case of controlling a hydrogenation temperature at an initial period of the hydrogenation reaction wherein a large quantity of reaction heat is generated or controlling the hydrogenation temperature of a polymer solution having a high viscosity.

The polymer containing an olefinic unsaturated group in the present invention is a polymer to be hydrogenated, and includes a raw material, i.e., a polymer containing an olefinic unsaturated group which is not hydrogenated at all, and a polymer containing an olefinic group which is hydrogenated to some extent and still contains remaining olefinic unsaturated groups.

The polymer containing an olefinic unsaturated group in the present invention is a conjugated diene polymer, a random, tapered or block copolymer of a conjugated diene and a vinyl aromatic compound, or a composition containing them at an arbitrary ratio. Also, it incorporates conjugated dienes through 1,4-, 1,2- or 3,4-bonds, and contains olefinic unsaturated groups derived from the conjugated dienes. The addition position of the conjugated diene unit in the polymer containing the olefinic unsaturated group includes 1,2-, 3,4- and 1,4-addition. The ratio thereof is not particularly limited. The process of the present invention can apply to any of the positions.

The conjugated diene includes a conjugated diene having from 4 to 20 carbon atoms, specifically 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and the like. From the viewpoint of industrial advantages and the preparation of elastic products having excellent physical properties, 1,3-butadiene and isoprene are preferred. Examples of the vinyl aromatic compound include styrene, α-methylstyrene, p-methylstyrene, divinylbenzene, 1,1-diphenylethylene, N,N-dimethyl-p-aminoethylstyrene, N,N-diethyl-p-aminoethylstyrene and the like. The preferred is styrene and α-methylstyrene.

In the present invention, when the polymer containing an olefinic unsaturated group is a copolymer of a conjugated diene and a vinyl aromatic compound, the ratio of these compounds in the polymer is preferably from 5/95 to 95/5 based on mass ratio.

The conjugated polymer or the random or tapered copolymer of the conjugated dienes and the vinyl aromatic compound usable in the present invention has a number average molecular weight of preferably from 10,000 to 3,000,000, more preferably from 50,000 to 1,500,000.

The block copolymer usable in the present invention includes block copolymers represented by any one of the following general formulas and arbitrary compositions thereof.

$(A-B)_n$, $A-(B-A)_n$, $B-(A-B)_n$, $[(B-A)_n]_{m+1}-X$,

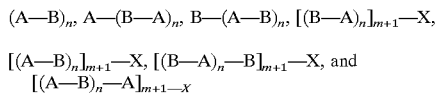

$[(A-B)_n-A]_{m+1-X}$ (In the above-listed formulas, A represents a polymer block mainly composed of vinyl aromatic hydrocarbons, and B represents a polymer block mainly composed of conjugated dienes. The boundary of A block and B block is not necessary to clearly distinguish. Moreover, n is 1 or more, preferably an integer of from 1 to 5. X represents, for example, a residue of a coupling agent such as a polyhalogenated organic silicon compound like silicon tetrachloride, a polyhalogenated organic tin compound like tin tetrachloride, epoxidized soybean oil, a compound having from 2 to 6 functional epoxy groups, polyhalogenated hydrocarbon, carboxylic acid ester, and a polyvinyl compound such as divinylbenzene, dialkyl carbonates like dimethyl carbonates; or a residue of an initiator such as a polyfunctional organic lithium compound. m is 1 or more, preferably an integer of from 1 to 10.)

In the above-mentioned formulas, the term "polymer block mainly composed of vinyl aromatic hydrocarbons" generally means a copolymer block of vinyl aromatic hydrocarbons and conjugated dienes which contains 50 wt % or more, preferably 70 wt % or more, of the vinyl aromatic hydrocarbons, and/or a homopolymer block of vinyl aromatic hydrocarbons. The term "polymer block mainly composed of conjugated dienes" generally means a copolymer block of conjugated dienes and vinyl aromatic hydrocarbons which contains 50 wt % or more, preferably 70 wt % or more, of the conjugated dienes, and/or a homopolymer block of conjugated dienes. The vinyl aromatic hydrocarbons in the copolymer block may be distributed uniformly or in the tapered form. There may coexist parts in which vinyl aromatic hydrocarbons are distributed uniformly and those in which vinyl aromatic hydrocarbons are distributed in the tapered form. The polymer block mainly composed of vinyl aromatic hydrocarbons has a number average molecular weight of preferably from 5,000 to 300,000, more preferably from 7,000 to 200,000. The polymer block mainly composed of conjugated dienes has a number average molecular weight of preferably from 5,000 to 500,000, more preferably from 10,000 to 300,000. The number average molecular weight of the entire block copolymer is preferably from 20,000 to 1,000,000, more preferably from 30,000 to 800,000. In the present invention, the number average molecular weight is obtained by conducting measurements according to gel permeation chromatography (GPC) and obtaining a peak molecular weight of chromatogram using a working curve which is obtained by measuring a standard polystyrene on the market (which is prepared using a peak molecular weight of the standard polystyrene).

A polymer containing an olefinic unsaturated group may be prepared, for example, by polymerization in an inert hydrocarbon solvent using an organic alkali metal compound as an initiator. Herein, the inert hydrocarbon solvent indicates a solvent which does not adversely affect the reaction of polymerization or hydrogenation of a polymer containing an olefinic unsaturated group. Although the inert hydrocarbon solvents used in the steps of polymerization and hydrogenation may be different in composition, it is preferable to conduct hydrogenation subsequent to polymerization in the same inert hydrocarbon solvent as used in the polymerization. Preferred solvents include aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbon such as benzene, toluene, xylene, and ethylbenzene. When an aromatic hydrocarbon is employed as a solvent, it is preferable to use such a solvent under the condition where aromatic double bonds are not hydrogenated.

Organoalkali metallic compounds used as polymerization initiators for a polymer containing an olefinic unsaturated group include aliphatic hydrocarbon alkalimetallic compounds, aromatic hydrocarbon alkalimetallic compounds, organoamino alkalimetallic compounds and the like, and alkali metals include lithium, sodium, potassium and the like. Preferred organoalkali metallic compounds include aliphatic or aromatic hydrocarbon lithium compounds having from 1 to 20 carbon atoms, i.e., compounds containing one lithium per molecule and those having two or more lithium per molecule such as dilithium compounds, trilithium compounds and tetralithium compounds. Specifically, there can be exemplified n-propyl lithium, n-butyl lithium, sec-butyl lithium, tert-butyl lithium, n-pentyl lithium, n-hexyl lithium, benzyl lithium, phenyl lithium, tolyl lithium, a reaction product of diisopropenylbenzene and sec-butyl lithium, a reaction product of divinylbenzene, sec-butyl lithium and a small amount of 1,3-butadiene, and the like. In addition, 1-(t-butoxy) propyl lithium and a lithium compound introducing from one to several isoprene monomers to improve its solubility which are disclosed in U.S. Pat. No. 5,708,092; alkyl lithium containing siloxy groups such as 1-(t-butyldimethylsiloxy) hexyl lithium which is disclosed in British Patent No. 2,241,239; and amino lithiums such as alkyl lithium containing amino groups, diisopropyl amide lithium and hexamethyldisilazide lithium which are disclosed in U.S. Pat. No. 5,527,753 can be used.

When a polymer containing an olefinic unsaturated group is prepared by polymerization of conjugated diene or that of conjugated diene and a vinyl aromatic compound using an organoalkali metallic compound as a polymerization initiator, a tertiary amine compound or ether compound can be added to increase vinyl structure of the conjugated diene (1,2- or 3,4-bonds). As examples of tertiary amine compounds, there can be exemplified compounds represented by the general formula, $R^1R^2R^3N$, wherein $R^1$, $R^2$, and $R^3$ represent hydrocarbon groups having from 1 to 20 carbon atoms or those having tertiary amino groups.

Examples of these compounds include trimethylamine, triethylamine, tributylamine, N,N-dimethylaniline, N-ethylpiperidine, N-methylpyrolidine, N,N,N',N'-tetramethylethylenediamine, N,N,N',N'-tetraethylethylenediamine, 1,2-dipiperidinoethane, trimethyl aminoethylpiperazine, N,N,N',N'',N''-pentamethylethylene triamine, N,N'-dioctyl-p-phenylenediamine and the like. The ether compounds may be either a straight-chain ether compound or a cyclic ether compound. Examples of the straight-chain ether compound include dimethyl ether; diethyl ether; diphenyl ether; dialkyl ether compounds of ethylene glycol such as ethylene glycol dimethyl ether, ethylene glycol diethyl ether and ethylene glycol dibutyl ether; dialkyl ether compounds of diethylene glycol such as diethylene glycol dimethyl ether, diethylene glycol diethyl ether and diethylene glycol dibutyl ether; and the like. Examples of the cyclic ether compound include tetrahydrofuran, dioxane, 2,5-dimethyl oxorane, 2,2,5,5-tetramethyl oxorane, 2,2-bis(2-oxoranyl)propane, alkyl ether of furfuryl alcohol, and the like.

Polymers containing olefinic unsaturated groups may be prepared either by batch polymerization or continuous polymerization.

Living growth ends of polymers containing olefinic unsaturated groups are preferably deactivated by a deactivator prior to hydrogenation for the purpose of restraining metallation reactions or the like among polymer chains which causes formation of macromolecules or gelation. Instead of the deactivation, a multifunctional compound having two or more functional groups in one molecule may be added to the polymer to form a branched or star polymer.

Although deactivators are not particularly limited, those like hydroxyl, carbonyl, ester, and epoxy groups, which generate alkoxy metals by reaction with organometallic compounds, or those like halogenated compounds, which generate metal halides, are preferred. In some cases, compounds having ester, ketone, aldehyde, isocyanate, amino, imino or acid anhydride groups, polyepoxy compounds or polyhalogenated compounds may be used. These compounds may be also used for the purpose of adding polar groups to polymer ends by reaction with alkali metal ends of the polymer, or for the purpose of either increase in a molecular weight or production of branches by coupling. Examples of deactivators include water, hydrogen, carbon dioxide gases and the like in addition to (polyvalent) alcohols, (polyvalent) phenols, organic carboxylic acids, organic carboxylic anhydrides, organic carboxylic acid esters, ketones, epoxy compounds and the like. These deactivators may be used alone or in combination.

Solvents of a polymer solution containing olefinic unsaturated groups are inert hydrocarbon solvents, and include the same solvents as used for the polymerization of a polymer containing olefinic unsaturated groups.

Solvents of a polymer solution containing olefinic unsaturated groups or solvents being used for the polymerization may contain compounds containing unsaturated groups like butenes, such as 1-butene or isobutene at a content, for example, of 30 wt % or less. However, since one part of the butenes are hydrogenated, it is preferable to reduce the content of butenes in the polymer solution containing olefinic unsaturated group to as small as possible by an operation like flushing before a hydrogenation reaction.

The concentration of a polymer in the polymer solution containing olefinic unsaturated groups is preferably 5 wt % or more, more preferably 10 wt % or more from the viewpoint of energy load at the post-processing for the separation of the hydrogenated polymer and the solvent and a production cost. From the viewpoint of miscibility with hydrogen, hydrogenation catalysts or the like and heat transfer property, it is preferably 40 wt % or less, more preferably 30 wt % or less.

The hydrogenation catalyst used for the process of the present invention is not particularly limited, and examples thereof include (1) a supported heterogeneous hydrogenation catalyst, which comprises a metal such as nickel, platinum, palladium and ruthenium supported by carbon, silica, alumina, diatomaceous earth or the like, (2) a so-called Ziegler type hydrogenation catalyst, which uses transition metal salt like organic acid salt or acetylacetone salt of nickel, cobalt, iron, chromium or the like, and a reducing agent like organoaluminum, (3) a so-called homogeneous hydrogenation catalyst such as an organometallic complex of an organometallic compound of titanium, ruthenium, rhodium, zirconium or the like. Among them, a preferred hydrogenation catalyst is a titanocene compound or a mixture of a titanocene compound and a reducible organometallic compound. As a titanocene compound, compounds described in Japanese Patent Application Laid-Open No. 8-109219 may be used. Specific examples thereof include compounds containing at least one ligand having (substituted) cyclopentadienyl frames such as biscyclopentadienyl titanium dichloride and monopentamethylcyclopentadienyl titanium trichloride, indenyl frames or fluorenyl frames. Examples of the reducible organometallic compounds include an organoalkalimetalic compound like organolithium, an organomagnesium compound, an organoaluminum compound, an organic boron compound, an organozinc compound or the like.

The present invention exhibits its effects more sufficiently when metallocene compounds are used as a hydrogenation catalyst. The metallocene hydrogenation catalysts are organometallic compounds of titanium, zirconium, hafnium or the like having same or different two (substituted) cyclopentadienyl groups as a ligand, and are preferably used with reducible organometallic compounds such as alkyllithium, alkylsodium, alkylpotassium, alkylmagnesium, alkylaluminum and alkylzinc.

Among the metallocene hydrogenation catalysts, a titanocene catalyst is preferable. Preferred examples of the hydrogenation process using a titanocene catalyst include a process for hydrogenating olefin compounds using specific titanocene compounds and alkyllithium (Japanese Patent Application Laid-Open Nos. 61-33132 and 1-53851), a process for hydrogenating olefinic unsaturated (co-) polymers using metallocene compounds and organoaluminum, organozinc or organomagnesium (Japanese Patent Application Laid-Open Nos. 61-28507 and 62-209103), a process for hydrogenating living polymers containing olefinic unsaturated groups using specific titanocene compounds and alkyllithium (Japanese Patent Application Laid-Open Nos. 61-47706 and 63-5402), a process for hydrogenating olefinic double bonds in polymers containing olefinic unsaturated double bonds using Tebbe reagents, i.e., metallacyclic compounds of a titanocene compound and trimethylammonium (Japanese Patent Application Laid-Open No. 11-71426), a process for hydrogenating olefinic double bonds in polymers containing olefinic unsaturated double bonds using titanocene compounds and a specific amount of lithium alkoxide (Japanese Patent Application Laid-Open No. 1-275605) or the like. Hydrogenation conditions may be adopted from those suitably described for each of the above catalysts in the respective specification.

The addition amount of a hydrogenation catalyst is preferably 0.001 mmol or more per 100 g of the polymer containing olefinic unsaturated groups from the viewpoint of efficient hydrogenation of olefinic unsaturated groups. From the viewpoint of deliming or removal of a catalyst after the hydrogenation reaction and economical efficiency, it is preferably 5 mmol or less per 100 g of the polymer containing olefinic unsaturated groups. The addition amount of the catalyst is more preferably from 0.002 to 1 mmol, furthermore preferably 0.005 to 0.2 mmol per 100 g of the polymer containing olefinic unsaturated groups.

Hydrogenation catalysts are generally supplied to a reactor in the form of a solution. Any solvents can be employed as long as they do not adversely affect hydrogenation. They include, for example, aliphatic hydrocarbons such as n-pentane, n-hexane, n-heptane and n-octane; alicyclic hydrocarbons such as cyclohexane, cycloheptane, methylcyclohexane and methylcycloheptane; and aromatic hydrocarbons such as benzene, toluene, xylene and ethylbenzene. These solvents may contain cyclic or straight-chain ethers such as tetrahydrofuran, dimethyl ether, diethyl ether, dimethoxy ethane, diethoxy ethane, dibutoxy ethane, diethylene glycol dimethyl ether, diethylene glycol diethyl ether and diethylene glycol dibutyl ether, or tertiary amines such as triethylamine and tetramethylethylene diamine in a small amount, within the range where the purpose of this invention is not ruined. The concentration of a hydrogenation catalyst is not particularly limited. For example, when the hydrogenation catalyst is a metallocene compounds, it is preferably used in the form of a metallocene complex with a concentration of from 1 to 10 wt %. A higher concentration may be adopted when the solubility is higher.

The hydrogenation catalysts may be supplied to a hydrogenation reactor either separately from the polymer solution containing olefinic unsaturated groups or after being mixed with the polymer solution containing olefinic unsaturated groups or with a hydrogenated polymer solution to be recycled.

Hydrogenation catalysts are preferably supplied to a reactor in two or more times or continuously to restrain a rapid exothermic reaction and stabilize the hydrogenation reaction, by which a catalyst amount to be supplied and a reaction period are reduced so that the hydrogenation reaction can be performed more efficiently. Such a supplying method exhibits its effects especially at the hydrogenation using a metallocene hydrogenation catalyst which is easy to deactivate by decomposition, dimerization or the like at a raised reaction temperature. Moreover, the effects of the supplying method is remarkably exhibited in a large-sized industrial reactor since such a reactor is difficult to cool down.

In a continuous hydrogenation process, hydrogenation catalysts are preferably supplied to a reactor continuously as well as the polymer solutions containing olefinic unsaturated groups. The reason is that the reaction and reaction temperature are comparatively easy to control by adjusting the supplying rate. In addition, it is also preferable to supply the hydrogenation catalysts in two or more times. In a continuous hydrogenation process, the hydrogenation catalysts may be supplied according to the following manners. When one hydrogenation reactor is used, a solution of hydrogenation catalyst is continuously supplied to the reactor. When two or more hydrogenation reactors connected in series are used, a solution of hydrogenation catalyst is continuously supplied to a first reactor, or a solution of hydrogenation catalyst is continuously supplied to a first reactor and further continuously or intermittently supplied to at least one reactor arranged downstream of the first reactor. The amount of additional supply of the hydrogenation catalyst can be properly set so as to achieve a target degree of hydrogenation in each reactor.

In a batch hydrogenation process, hydrogenation catalysts are preferably supplied not all at one time but either several times by small amounts, or continuously or intermittently by small amounts to restrain a rapid hydrogenation reaction at the initial stage and control a reaction temperature.

When hydrogenation catalysts are supplied two or more times, the amount of the first supply is not necessary to be an ordinary amount to complete the hydrogenation reaction by one supply, rather preferably less than the ordinary amount. A preferred amount of the first supply is such that it attains a degree of hydrogenation of from 50 to 90%, for example, it is 70% or less, particularly 50% or less of the ordinary amount. Although the hydrogenation reaction may stop halfway in the case of such a small amount of the catalyst, the reaction continues by supplying the catalyst additionally, and, as a result, the hydrogenation reaction can complete in a short time with a small amount of the hydrogenation catalyst.

When hydrogenation catalysts are supplied in two or more times, the timing of the additional supply of hydrogenation catalyst is preferably judged from an absorption rate of hydrogen. The absorption rate can be obtained, for example, by measuring an amount of hydrogen supplied to a reactor. If the pressure or temperature of a reactor changes, the absorption rate of hydrogen is obtainable by calculating the amount of hydrogen remaining in a reactor according to an amended pressure or temperature and subtrating the remaining amount from the supplied amount of hydrogen. Further, it is also possible to introduce a necessary amount of hydrogen to a reactor in advance and obtain the absorption rate by measuring pressure reduction of the reactor, though control of the hydrogenation reaction becomes slightly difficult.

When hydrogenation catalysts are supplied two or more times, timing of the second and following supply is preferably at a time when an absorption rate of hydrogen reduces to 80% or less, more preferably 60% or less, of an initial absorption rate of hydrogen at the beginning of reaction from the viewpoint of the addition amount of the catalyst and the hydrogenation reaction period. Here, an "initial absorption rate of hydrogen at the beginning of reaction" means at the time when the absorption rate of hydrogen becomes steady after the initiation of the hydrogenation reaction. Generally, the stable absorption rate is exhibited several minutes after the hydrogenation reaction is started. As long as the degree of hydrogenation exceeds a prescribed value, it is not necessary to additionally supply the hydrogenation catalyst even if the absorption rate of hydrogen is reduced. Though, a small amount of the hydrogenation catalyst may be additionally supplied to obtain a higher degree of hydrogenation.

The above-mentioned supplying method of a catalyst is particularly useful in the case of using a metallocene hydrogenation catalyst. In the process for hydrogenating a polymer containing olefinic unsaturated groups using metallocene compound as a catalyst, the hydrogenation reaction rate shifts almost constantly without depending on the progress of the hydrogenation reaction, and it tends to be rather accelerated in the latter half of the reaction. Therefore, by observing the absorption rate of hydrogen, it becomes possible to anticipate a degree of deterioration of the hydrogenation catalyst and judge necessity and timing of additional supply of catalyst adequately.

The timing of additional supply of hydrogenation catalysts is reproducible in many cases if the conditions are the same. In hydrogenation processes under the same conditions, after weighing timing of additional supply by absorption rate of hydrogen once or several times according to the above-mentioned manner and confirming an adequate timing, other management indexes, e.g., time, degree of hydrogenation or reaction temperature, may be employed to decide the timing instead of the absorption rate of hydrogen.

In the present invention, the amount of additional supply of the hydrogenation catalyst may be properly selected according to the amount of remaining olefinic unsaturated groups. If the amount of the remaining olefinic unsaturated group is large at the time of additional supply of the catalyst, a large amount of the catalyst is additionally supplied. If it is small, a small amount is supplied. Specifically, an amount of additional supply is not more than the same amount of the catalyst as initially supplied, preferably not more than 70% thereof.

When hydrogenation catalysts are supplied in two or more times, the number of supply is not particularly limited. However, hydrogenation catalysts are supplied in preferably from 2 to 10 times, more preferably from 2 to 5 times, including the first supply from the viewpoint of stability and operationality of the hydrogenation reaction.

It is acceptable that the hydrogenation catalyst of the first supply is activated after being mixed with a conjugated diene polymer. The additional supply is preferably made after the hydrogenation activity is exhibited or in the state where the catalyst is immediately activated in the hydrogen atmosphere.

Although the hydrogenation catalysts of the first supply and additional supply may be different, it is preferable to use the same one from the viewpoint of simplicity of the operation.

The hydrogenation reaction of the present invention is carried out in the hydrogen atmosphere. Hydrogen is preferably supplied to the polymer solution containing olefinic unsaturated groups in the form of a gas, and it may contain inert gas such as nitrogen and argon within the range where the purpose of this invention is not impaired. Herein, the inert gas indicates a gas which does not react with a hydrogenation catalyst so that it does not cause deactivation of the catalyst.

Hydrogen is preferably supplied so as to disperse finely in a liquid phase in order to contact with the polymer containing olefinic unsaturated groups efficiently. To disperse hydrogen in the liquid phase efficiently finely, equipment like an atomizer can be used. Hydrogen is preferably supplied to a reactor from near its bottom. The unreacted hydrogen is preferably collected and recycled from the viewpoint of a production cost. For example, the unreacted hydrogen of the supplied hydrogen may be collected from the gas phase in the reactor with solvent vapor, separated from the solvent in the solvent collecting tank, and pressurized in a compressor to recycle. In addition, the hydrogen which is dissolved in the polymer solution may be separated and collected through a flash tank or the like, and pressurized in the compressor to recycle.

The pressure of hydrogen to be used for the hydrogenation reaction is preferably 0.1 MPa or more from the viewpoint of a hydrogenation speed, and also 15 MPa or less from the viewpoint of restraint of a side reaction and costs for equipping a hydrogenation reactor with high pressure resistance strength. The pressure of hydrogen is more preferably from 0.2 MPa to 10 MPa, furthermore preferably from 0.3 MPa to 5 MPa. The most suitable pressure of hydrogen is decided in relation to an amount of the catalyst to be added or the like. Substantially, it is preferred to select a higher pressure of hydrogen as the amount of the catalyst to be supplied becomes smaller. The pressure of hydrogenation is appropriately selected according to a desirable degree of hydrogenation within the above-mentioned range. When two or more reactors connected in series are used, the pressure of each reactors may be the same or different. Generally, it is preferred that the pressure differential between reactors is smaller, e.g., preferably 2 MPa or less, more preferably 1 MPa or less, most preferably 0.5 MPa or less from the viewpoint of smooth transportation of the polymer solution.

As a hydrogenation reactor, for example, tank, column and tube reactors and the like may be used, and is not particularly limited. When one reactor is used as a hydrogenation reactor, a tank reactor which has an L/D of from 1 to 8 and is equipped with a stirrer is preferably used. Herein, L represents a length between the upper tangent line and the lower tangent line of a reactor and D represents the inside diameter of the reactor. When plural reactors are connected to use, it is preferred that a tank reactor having an L/D of from 1 to 8 and equipped with a stirrer is used as a first reactor and a tank reactor having an L/D of from 1 to 8 and equipped with a stirrer, or a column or tube reactor having an L/D of from 2 or more, preferably 3 or more, and more preferably 5 or more is used as second and following reactors arranged downstream of the first reactor. In the case where a column or tube reactor is used, a reactor having a larger L/D is preferred in order to make the distribution of degree of hydrogenation as narrow as possible and to obtain a polymer having a comparatively uniform degree of hydrogenation. For such a purpose, a reactor having an extremely large L/D like a loop reactor may be used. From the industrial viewpoint, i.e., from the viewpoint of operationality and cleaning of a reactor, the L/D of a column or tube reactor is preferably 50 or less, more preferably 30 or less, furthermore preferably 20 or less.

Although it is not necessary to employ a reactor equipped with a stirrer, the hydrogenation reaction is preferably conducted with stirring to promptly contact the supplied hydrogen with a polymer containing olefinic unsaturated groups, and a reactor equipped with a stirrer having high stirring ability is preferably used. Especially, at a time when a large amount of hydrogen is consumed, e.g., at the initial stage of a reaction in batch hydrogenation or at continuous hydrogenation having a high production speed, the hydrogenation is preferably performed while stirring from the viewpoint of uniformity of hydrogenation reactions, removal of reaction heat or prevention of regional and abnormal reactions. As a stirrer, any type such as a turbine type, a paddle type, a screw type, an anchor type, a full zone type or a static type may be used. Generally, in order to disperse a gas into a liquid phase finely, a disc turbine or paddle type stirrer is effective and most preferred. When a stirring speed cannot be increased, it is effective to install a ringed sparger right under a stirring blade. A stirring blade may be arranged vertically in a multiple stage. In addition, a flat perforated plate, a baffle plate or the like may be installed in the reactor if necessary. When a tube reactor is used, a static type stirrer is preferred. A static mixer element may be installed in the piping.

The temperature of the hydrogenation reaction may be properly selected according to the kind of a catalyst or the like. It is preferably 0° C. or higher from the viewpoint of a reaction rate or the amount of a catalyst used, and is preferably 200° C. or lower from the viewpoint of restraint of a side reaction, decomposition or gelation of polymer chains, or catalyst activities. More preferred temperature range is from 30° C. to 150° C., particularly from 50° C. to 130° C.

In the case of a continuous hydrogenation process, an average residence time of hydrogenation may be properly selected in view of the operation stability, productivity and a target degree of hydrogenation. In general, it is preferably from 3 minutes to 10 hours, more preferably from 10 minutes to 5 hours, most preferably from 30 minutes to 3 hours.

In the case of a continuous hydrogenation process, it is preferred that a polymer containing olefinic unsaturated groups is hydrogenated in a reactor beforehand to achieve a degree of hydrogenation at a desirable level and then continuous hydrogenation reaction is commenced, since a polymer having a desirable degree of hydrogenation can be prepared from the initial stage of the operation. On the other hand, in the case where it is attempted to prepare a polymer having a high degree of hydrogenation by continuous hydrogenation from the beginning of the reaction but a large amount of a polymer other than a polymer having an objective degree of hydrogenation is obtained at the initial stage of the operation, treatment of the obtained polymer is preferably conducted.

The degree of hydrogenation of the hydrogenated polymer obtained by the process of the present invention may be properly selected according to the purposes and is not particularly limited. The olefinic unsaturated groups contained in the polymer containing olefinic unsaturated groups may be hydrogenated either almost in the whole (at a degree of hydrogenation of 90% or more, preferably 98% or more in accordance with 1H-NMR) or only in one part. When only one part is hydrogenated, the degree of hydrogenation is preferably controlled by an amount of hydrogen supplied to a reactor so as to be 3% or more and less than 95%, or 5% or more and less than 90%, if desired from 10% to 85%. It can be also controlled by deactivating a hydrogenation catalyst at the time when the degree of hydrogenation reaches a desirable level. When the degree of hydrogenation is controlled within the range of 3% or more and less than 95%, the desirable degree of hydrogenation can be characteristically achieved even if the amount of a hydrogenation catalyst is 90% or less, further 80% or less or 60% or less, of that used in the case where the degree of hydrogenation is controlled within the range of 95% or more. The degree of hydrogenation can be easily measured by using 1H-NMR. In addition, the degree of hydrogenation may be measured by comparing with a pre-hydrogenated polymer using FT-IR.

From the polymer solution subjected to the hydrogenation reaction according to the process of the present invention, a catalyst residue may be removed to separate a hydrogenated polymer from solution if necessary. Examples of separation methods include a method comprising collecting a precipitated polymer obtained by adding a polar solvent, a poor solvent for a hydrogenated polymer such as acetone and alcohol, to a reaction liquid after hydrogenation; a method comprising collecting a hydrogenated polymer by putting a reaction liquid to hot water with stirring and removing a solvent therefrom by steam stripping, a method comprising removing a solvent by direct heating of a reaction liquid; and the like.

EXAMPLE

Hereinafter the present invention is specifically illustrated referring to Examples, but it is not limited thereto.

Schematic flows of Examples 1 through 5 and 11 and Comparative Example 1 are shown in FIGS. 1 through 7. In these FIGS., 1 and 1' represent supply lines for a hydrogenation catalyst; 2 represents a supply line for a polymer solution containing olefinic unsaturated groups; 3, 3' and 3" represent supply lines for hydrogen; 4 represents a discharge line for a hydrogenated polymer solution; 5 and 5' represent recycle lines for the hydrogenated polymer solution; 6, 6' and 6" represent reactors; and 7 and 7' represent heat exchangers.

Methods for measuring physical properties and preparation examples of polymers and hydrogenation catalysts in Examples and Comparative Examples are described below.
1) Measurement of Physical Properties of a Polymer Containing Olefinic Unsaturated Groups
1-1) Content of styrene: Calculated from absorption strength of 262 nm using a ultraviolet ray spectrophotometer (UV200, manufactured by Hitachi, Ltd.)
1-2) Peak molecular weight and composition ratio: Measured by GPC (LC-10 AD, manufactured by Simadzu Corporation) using tetrahydrofuran as a solvent at 35° C. The peak molecular weight was a molecular weight at the peak of chromatogram which was obtained using a working curve prepared by measuring commercially available standard styrene (trade name: Polystyrene Standards, manufactured by American Polymer Standards Corporation). When a polymer consists of two or more components, a composition ratio was obtained by a ratio of areas at the peak of chromatogram of each component.
1-3) Content of vinyl bonds and degree of hydrogenation:
Measured using a nuclear magnetic resonance device (DPX-400, manufactured by BRUKER Corporation).
2) Preparation Examples of a Polymer Containing Olefinic Unsaturated Groups
2-1) Polymer A In a jacketed autoclave equipped with a stirrer, which was already washed, dried and substituted with nitrogen, were charged a cyclohexane solution containing 10 parts by mass of pre-refined styrene. Then, n-butyllithium and tetramethylethylenediamine were added and polymerization was carried out at 70° C. for 1 hour. The polymerization was continued for 1 hour after adding a cyclohexane solution containing 80 parts by mass of pre-refined butadiene and further for 1 hour after adding a cyclohexane solution containing 10 parts by mass of styrene. After that, methanol was added to stop the reaction. A block copolymer having a styrene content of 20 wt %, a 1,2-vinyl bond content in polybutadiene parts of 40 wt % and a number-average molecular weight of 100,000 was prepared.
2-2) Polymer B Polymerization was conducted in the same manner as in the preparation of Polymer A to prepare a block copolymer which had a styrene content of 30 wt %, a 1,2-vinyl bond content in polybutadiene parts of 45 wt % and a number-average molecular weight of 300,000.
2-3) Polymer C In a jacketed autoclave equipped with a stirrer, which was already washed, dried and substituted with nitrogen, were charged a cyclohexane solution containing 30 parts by mass of pre-refined styrene. Then, n-butyllithium and tetramethylethylenediamine were added and polymerization was carried out at 70° C. for 1 hour. The polymerization was continued for 1 hour after adding a cyclohexane solution containing 70 parts by mass of pre-refined butadiene. After that, dichlorodimethylsilane was added to carry out a coupling reaction. To a polymer which was not partially deactivated was added methanol to stop the reaction. The obtained polymer was a block copolymer having a styrene content of 30 wt % and a 1,2-vinyl bond content in polybutadiene parts of 40 wt %, and a molecular weight and content of coupled high molecular weight components of 140,000 and 30 wt %, respectively, and a molecular weight and content of uncoupled low molecular weight components of 70,000 and 70 wt %, respectively.

2-4) Polymer D

In a jacketed autoclave equipped with a stirrer, which was already washed, dried and substituted with nitrogen, were charged a cyclohexane solution containing 10 parts by mass of pre-refined butadiene. Then, n-butyllithium and tetramethylethylenediamine were added and polymerization was carried out at 70° C. for 1 hour. The polymerization was continued for 1 hour after adding a cyclohexane solution containing 17.5 parts by mass of pre-refined styrene. Subsequently, the polymerization was further continued for 1 hour after adding a cyclohexane solution containing 55 parts by mass of pre-refined butadiene to the reaction system, and for 1 hour after further adding a cyclohexane solution containing 17.5 parts by mass of styrene. After that, methanol was added to stop the reaction and a block copolymer having a styrene content of 40 wt %, a 1,2-vinyl bond content in polybutadiene parts of 50 wt % and a number-average molecular weight of 150,000 was prepared.

2-5) Polymer E

A polymerization was conducted in the same manner as in the preparation of Polymer A except that addition amounts of n-butyllithium and tetramethylethlenediamine were changed. A block copolymer having a styrene content of 70 wt %, a 1,2-vinyl bond content in polybutadiene parts of 30 wt % and a number-average molecular weight of 60,000 was prepared.

2-6) Polymer F

A polymerization was conducted in the same manner as in the preparation of Polymer A except that an addition amount of tetramethylethlenediamine was increased and a polymerization temperature was set at 30° C. A block copolymer having a styrene content of 20 wt %, a 1,2-vinyl bond content in polybutadiene parts of 75 wt % and a number-average molecular weight of 200,000 was prepared.

2-7) Polymer G

In a jacketed autoclave equipped with a stirrer, which was already washed, dried and substituted with nitrogen, were charged a cyclohexane solution containing 15 parts by mass of pre-refined styrene. Then, n-butyllithium was added and polymerization was carried out at 70° C. for 1 hour. The polymerization was continued for 1 hour after adding a cyclohexane solution containing 70 parts by mass of pre-refined isoprene and further for 1 hour after adding a cyclohexane solution containing 15 parts by mass of styrene. The obtained polymer was a block copolymer having a styrene content of 30 wt % and a total content of vinyl bonds in polyisoprene parts of 5 wt %, and a number-average molecular weight of 350,000.

2-8) Polymer H

A jacketed autoclave equipped with a stirrer was washed, dried and substituted with nitrogen. An n-hexane solution containing 20 wt % of pre-refined butadiene, an n-hexane solution of n-butyllithium and an n-hexane solution containing tetramethylethylenediamine were each continuously supplied to the reactor from its bottom, and continuous polymerization was carried out under the conditions of a reaction temperature of 100° C. and a resident time of about 40 minutes. To the resultant polymer solution was added methanol to stop the reaction to prepare a polybutadiene polymer having a 1,2-vinyl bond content in polybutadiene parts of 45 wt %, and a number-average molecular weight of 300,000.

2-9) Polymer I

In a jacketed autoclave equipped with a stirrer, which was already washed, dried and substituted with nitrogen, were charged a cyclohexane solution containing 15 wt % of pre-refined butadiene. After the temperature of the reactor was adjusted to 50° C., n-butyllithium and tetramethylethylenediamine were added to carry out polymerization for about 30 minutes. At the time when the temperature in the reactor stopped rising, silica tetrachloride was added for coupling. The obtained polymer was a polybutadiene having a 1,2-vinyl bond content in polybutadiene parts of 40 wt %, and a molecular weight and content of coupled high molecular weight components of 450,000 and 75 wt %, respectively, and a molecular weight and content of uncoupled low molecular weight components of 120,000 and 25 wt %, respectively.

2-10) Polymer J

After 4.3 tons of cychlohexane and 0.20 tons of a styrene monomer were charged in a 16 m$^3$ reactor equipped with a stirrer, 4.8 kg of a 15 wt % n-butyllithium/n-hexane solution and further 0.62 kg of tetramethylethylenediamine were added to conduct polymerization at an initial temperature of 70° C. for 40 minutes. Then, a cyclohexane solution containing 0.924 tons of a 1,3-butadiene monomer was added to continue polymerization for 1 hour. Further, a cyclohexane solution containing 0.20 tons of a styrene monomer was added to further continue polymerization for 40 minutes. The resultant polymer was a styrene-butadiene-styrene type block copolymer having a bound styrene content of 30 wt %, a block styrene content of 30 wt %, a 1,2-vinyl bond content in butadiene units of 37 wt % and a number-average molecular weight of about 230,000.

2-11) Polymer K

After 3.88 tons of cyclohexane and 0.264 tons of a styrene monomer were charged in a 16 m$^3$ reactor equipped with a stirrer, 17 kg of a 15 wt % n-butyllithium/n-hexane solution and further 2.1 kg of tetramethylethylenediamine were added to conduct polymerization at an initial temperature of 70° C. for 30 minutes with stirring. Then, a cyclohexane solution containing 1.242 tons of a 1,3-butadiene monomer was added to continue polymerization for 45 minutes. Further, a cyclohexane solution containing 0.264 tons of styrene monomer was added to further continue polymerization for 30 minutes. The resultant polymer was a styrene-butadiene-styrene type block copolymer having a bound styrene content of 30 wt %, a block styrene content of 30 wt %, a 1,2-vinyl bond content in butadiene units of 51 wt % and a number-average molecular weight of about 61,000.

3) Preparation Examples of Hydrogenation Catalysts

As hydrogenation catalysts, solutions prepared by the following methods were used.

3-1) Hydrogenation Catalyst I (TPM/Li)

Two liters of dried refined cyclohexane was charged in a reactor substituted with nitrogen, and 40 mmol of bis($\eta^5$-cyclopentadienyl)titaniumdi(p-tolyl) and 150 g of 1,2-polybutadiene having a molecular weight of about 1,000 (a content of 1,2-vinyl bonds: about 85%) were dissolved therein. Then, a cyclohexane solution containing 60 mmol of n-butyllithium was added to conduct a reaction at room temperature for 5 minutes. Immediately after the reaction, 40 mmol of n-butanol was added with stirring, and the resultant solution was preserved at room temperature.

3-2) Hydrogenation Catalyst II (Tebbe Reagent)

One liter of dried refined cyclohexane was charged in a reactor substituted with nitrogen, and 100 mmol of bis($\eta^5$-cyclopentadienyl)titaniumdichloride was added thereto. To the solution, a n-hexane solution containing 200 mmol of trimethyl aluminum was added while sufficiently stirring to conduct a reaction at room temperature for about 3 days.

3-3) Hydrogenation Catalyst III (TPM/Mg)

Two liters of dried refined cyclohexane was charged in a reactor substituted with nitrogen, and then 40 mmol of bis($\eta^5$-cyclopentadienyl)titaniumdi(p-tolyl) and 80 g of liquid 1,2-polybutadiene having molecular weight of about 1,000 (1,2-vinyl bond content: about 85%) were dissolved therein. To the solution, a cyclohexane solution containing 20 mmol of dibutylmagnesium was added and the resultant solution was preserved at room temperature.

3-4) Hydrogenation Catalyst IV (Tebbe Reagent)

A hydrogenation catalyst was prepared according to the method described in Japanese Patent Application Laid-Open No. 11-71426. 5 kg of bis($\eta^5$-cyclopentadienyl)titaniumdichloride (TC) was added to 70.1 kg of cyclohexane. After stirring, 24.9 kg of a 10% trimethylaluminum (TMAL) solution was added thereto. A reaction was carried out for 72 hours to prepare a hydrogenation catalyst (Tebbe reagent) solution.

3-5) Hydrogenation Catalyst V (TPM/Li)

In addition, the hydrogenation catalyst was prepared according to the method described in Japanese Patent Application Laid-Open No. 8-33846. Namely, 6 kg of bis($\eta^5$-cyclopentadienyl)titaniumdi(p-tolyl)(TPM) was dissolved to 526 kg of cyclohexane. After adding 60 kg of liquid 1,2-polybutadiene, 7.1 kg of a 15% butyllithium solution and further 0.6 kg of ethanol were added. A reaction was carried out to prepare a hydrogenation catalyst (TPM/Li).

Example 1
Continuous Hydrogenation Process 10.5 liters of Polymer A solution comprising 1,576 g of the polymer containing an olefinic unsaturated group was charged in a tank reactor equipped with a stirrer, which had an inner volume of 15 liters and an L/D of 3, and the temperature was increased to 70° C. After the inside of the reactor was substituted with hydrogen, the pressure in the reactor was increased to about 1 MPa (a gage pressure) in terms of hydrogen. While stirring, the solution of Hydrogenation Catalyst I was supplied to the reactor so that a Ti amount be 1.64 mmol, and simultaneously hydrogen was supplied to the reactor over 1 hour so that the pressure in the reactor be 1 MPa. When a small amount of the resultant polymer was sampled, the degree of hydrogenation of olefinic unsaturated groups derived from butadiene was found to be 98%.

Subsequently, the Polymer A solution and the Hydrogenation Catalyst I solution were supplied to the reactor from the top at a flow rate of about 120 ml/min (about 18 g/min in terms of a polymer containing olefinic unsaturated groups) and at a flow rate such that controls the Ti amount to be about 30 $\mu$mol/min, respectively. While, the solution of the hydrogenated polymer was discharged from the bottom of the reactor at a flow rate of about 600 ml/min (about 90 g/min in terms of a polymer containing olefinic unsaturated groups) and then one part thereof was recycled to the reactor at the position L/4 above the lower tangent line thereof. The recycling amount was controlled so that the mass ratio (Polymer A to be supplied to the reactor)/(the hydrogenated polymer to be recycled) was 1/4. The solution amount to be discharged from the reactor at the bottom thereof was controlled so as to keep the solution amount in the reactor about 10 liters. The hydrogenation temperature was controlled by passing the hydrogenated polymer solution to be recycled through a heat exchanger to cool down or, if necessary, heat up so as to keep the reactor temperature 90° C. The hydrogen was supplied to the reactor from the bottom so that the pressure in the reactor be 1 MPa. The schematic flow of this process is shown in FIG. 1.

The hydrogenated polymer solution discharged from the reactor was supplied to a deairing tank to deaerate the hydrogen contained therein to prepare a hydrogenated polymer.

The above-described continuous hydrogenation was continued for about 10 hours. The degree of hydrogenation of the hydrogenated polymer exhibited during the operation was extremely steady, that is, maintained at from 97.5 to 99.5% throughout the continuous hydrogenation reaction.

Comparative Example 1
Continuous Hydrogenation Process

Figure 2:
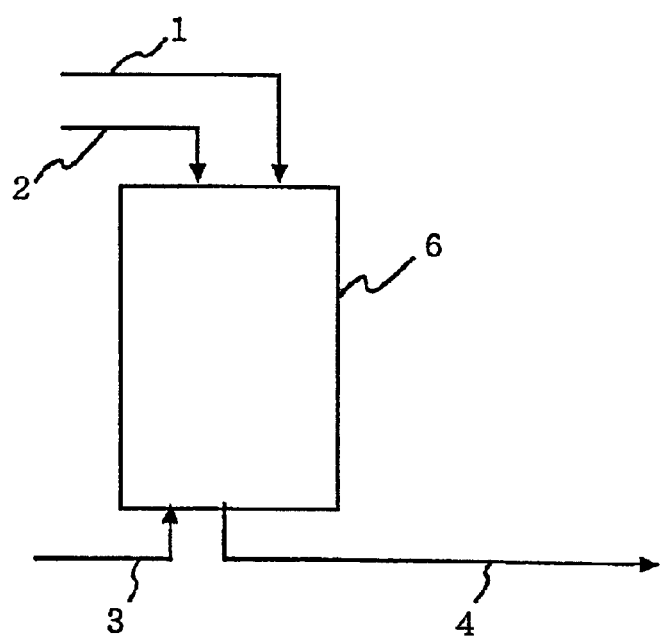
FIG. 2 shows a schematic flow of one example of the conventional process (Comparative Example 1).

The continuous hydrogenation was conducted in the same manner as in Example 1 except that the hydrogenated polymer discharged from the bottom of the reactor was not recycled. The schematic flow of this process is shown in FIG. 2. Although the reaction was designed so as to control the temperature of the hydrogenation reaction by the jacket attached to the reactor, the reaction temperature was increased and it was hard to control the temperature at a stable level. In addition, the degree of hydrogenation of the hydrogenated polymer prepared in the continuous hydrogenation reaction was from 85 to 93%. The hydrogenation reaction was not conducted steadily.

Example 2
Continuous Hydrogenation Process 10.5 liters of Polymer B solution comprising 1,576 g of the polymer containing an olefinic unsaturated group was charged in a tank reactor equipped with a stirrer, which had an inner volume of 15 liters and an L/D of 3, and the temperature was increased to 70° C. After the inside of the reactor was substituted with hydrogen, the pressure in the reactor was increased to about 1 MPa (a gage pressure) in terms of hydrogen. While stirring, the solution of Hydrogenation Catalyst I was supplied to the reactor so that the Ti amount be 3.28 mmol, and simultaneously hydrogen was supplied to the reactor over 1 hour so that the hydrogen pressure in the reactor be 1 MPa. When a small amount of the resultant polymer was sampled, the degree of hydrogenation of olefinic unsaturated groups derived from butadiene was found to be 98%.

Subsequently, the continuous hydrogenation reaction by two reactors connected in series was conducted using the above-mentioned reactor as a first reactor and a tank reactor equipped with a stirrer, which had an inner volume of 15 liters and an L/D of 6 as a second reactor.

Firstly, the Polymer B solution and the solution of Hydrogenation Catalyst I were supplied to the first reactor from the top at a flow rate of about 100 ml/min (about 15 g/min in terms of the polymer containing olefinic unsaturated groups) and at a flow rate such that controls the Ti amount to be about 22 $\mu$mol/min, respectively. At the same time, the solution of the hydrogenated polymer was discharged from the bottom of the above-mentioned reactor at a flow rate of about 2 liters/min (about 300 g/min in terms of the polymer containing olefinic unsaturated groups) and one part thereof was recycled to the first reactor at the position L/2 above the lower tangent line thereof. The recycling amount was controlled so that the mass ratio (Polymer B to be supplied to the reactor)/(the hydrogenated polymer to be recycled) was 1/19. The solution amount to be discharged from the bottom of the first reactor was controlled so that the amount of solution in the first reactor be kept about 10 liters. The hydrogenation reaction temperature was controlled by passing the hydrogenated polymer solution to be recycled through a heat exchanger to cool down or, if necessary, heat up so as to keep the reactor temperature 110° C. The hydrogen was supplied to the first reactor from the bottom so that the pressure in the reactor be 1 MPa.

The hydrogenated polymer solution discharged from the first reactor was supplied to the second reactor from the top, and at the same time a polymer solution hydrogenated in the second reactor was discharged from the bottom at a flow rate of about 100 ml/min (about 15 g/min in terms of the polymer containing olefinic unsaturated groups). The amount of the hydrogenated polymer solution discharged from the bottom of the second reactor was controlled so that the solution amount in the second reactor be kept about 10 liters.

Figure 3:
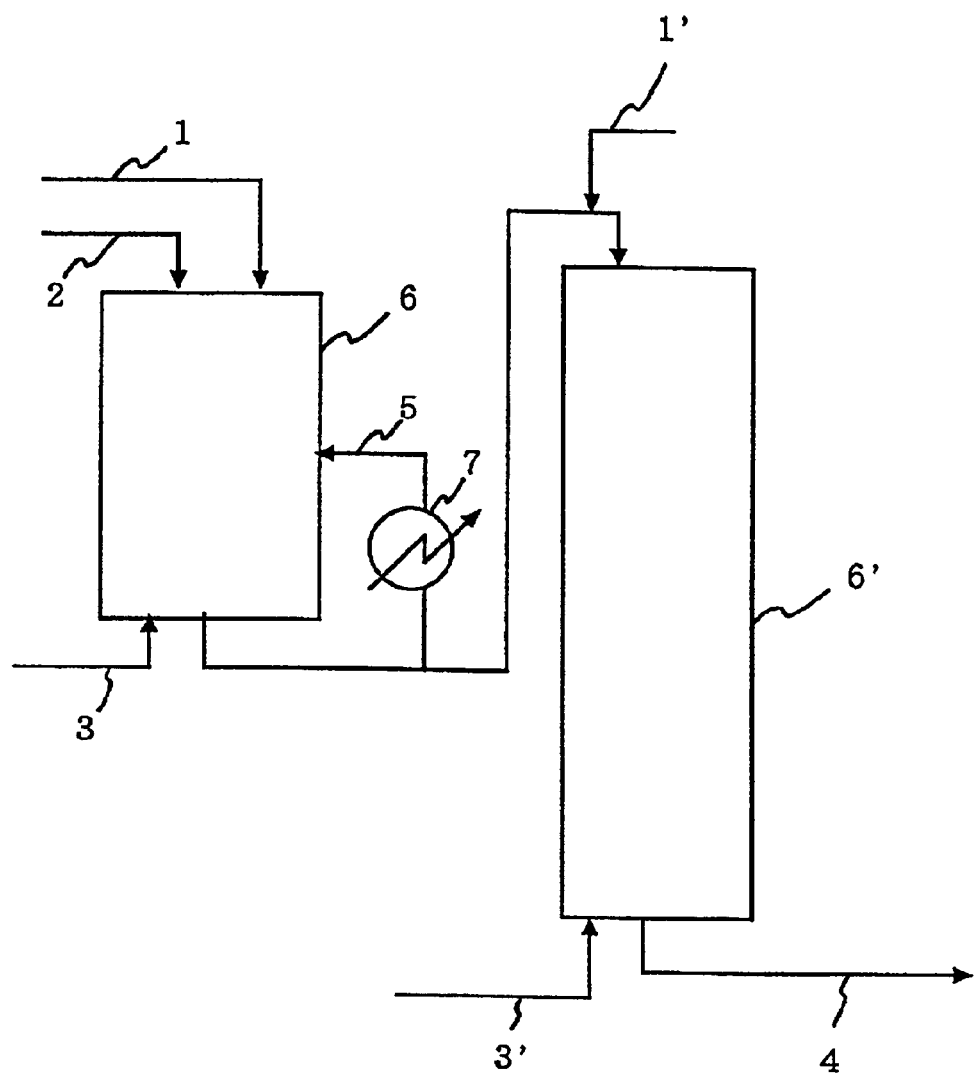
FIG. 3 shows a schematic flow of one example of the present invention (Example 2).

In the above operation, the hydrogenated polymer solution discharged from the first reactor was supplied to the second reactor after being mixed with the solution of Hydrogenation Catalyst I which was added thereto at a flow rate of about 8 μmol/min. The reaction temperature was controlled by the jacket attached to the second reactor so as to keep the reactor temperature 110° C. The hydrogen was supplied to the second reactor from the bottom so that the pressure in the reactor be 1 MPa. The schematic flow of this process is shown in FIG. 3.

The hydrogenated polymer solution being discharged from the second reactor was supplied to a deairing tank to deaerate the hydrogen contained therein to prepare a hydrogenated polymer.

The above-mentioned continuous hydrogenation was continued for about 10 hours. The degrees of hydrogenation of the polymer hydrogenated in the first and second reactors were extremely steady, that is, maintained from 80 to 93% and from 97.5 to 99.5%, respectively, throughout the reaction.

Example 3
Continuous Hydrogenation Process 10.5 liters of Polymer C solution comprising 1,576 g of the polymer containing olefinic unsaturated groups was charged in a tank reactor equipped with a stirrer, which had an inner volume of 15 liters and an L/D of 3, and the temperature was increased to 70° C. After the inside of the reactor was substituted with hydrogen, the pressure in the reactor was increased to about 1 MPa (a gage pressure) in terms of hydrogen. While stirring, the solution of Hydrogenation Catalyst II was supplied to the reactor so that the Ti amount be 1.64 mmol, and hydrogen was supplied to the reactor over 1 hour so that the pressure in the reactor be 1 MPa. When a small amount of the resultant polymer was sampled, the degree of hydrogenation of olefinic unsaturated groups derived from butadiene was found to be 98%.

Subsequently, the continuous hydrogenation reaction by two reactors connected in series was conducted using the above-mentioned reactor as a first reactor and a tube reactor having an inner volume of 10 liters and an L/D of 15 as a second reactor. In the tube reactor, a static mixer was arranged.

Firstly, the Polymer C solution and the solution of Hydrogenation Catalyst II were supplied to the first reactor from the top at a flow rate of about 180 ml/min (about 27 g/min in terms of the polymer containing olefinic unsaturated groups) and at a flow rate such that controls the Ti amount to be about 17 μmol/min, respectively. At the same time, the solution of the hydrogenated polymer was discharged from the bottom of the reactor at a flow rate of about 760 ml/min (about 108 g/min in terms of the polymer containing olefinic unsaturated groups) and then one part thereof was recycled to the first reactor at the position L/4 above the lower tangent line thereof. The recycling amount was controlled so that the mass ratio (Polymer C to be supplied to the reactor)/(the hydrogenated polymer to be recycled) was 1/3. The solution amount to be discharged from the bottom of the first reactor was controlled so that the amount of the solution in the first reactor be kept about 10 liters. The hydrogenation temperature was controlled by passing the hydrogenated polymer solution to be recycled through a heat exchanger to cool down or, if necessary, heat up so as to keep the reactor temperature 90° C. The hydrogen was supplied to the first reactor from the bottom so that the pressure in the reactor be 1.5 MPa.

Figure 4:
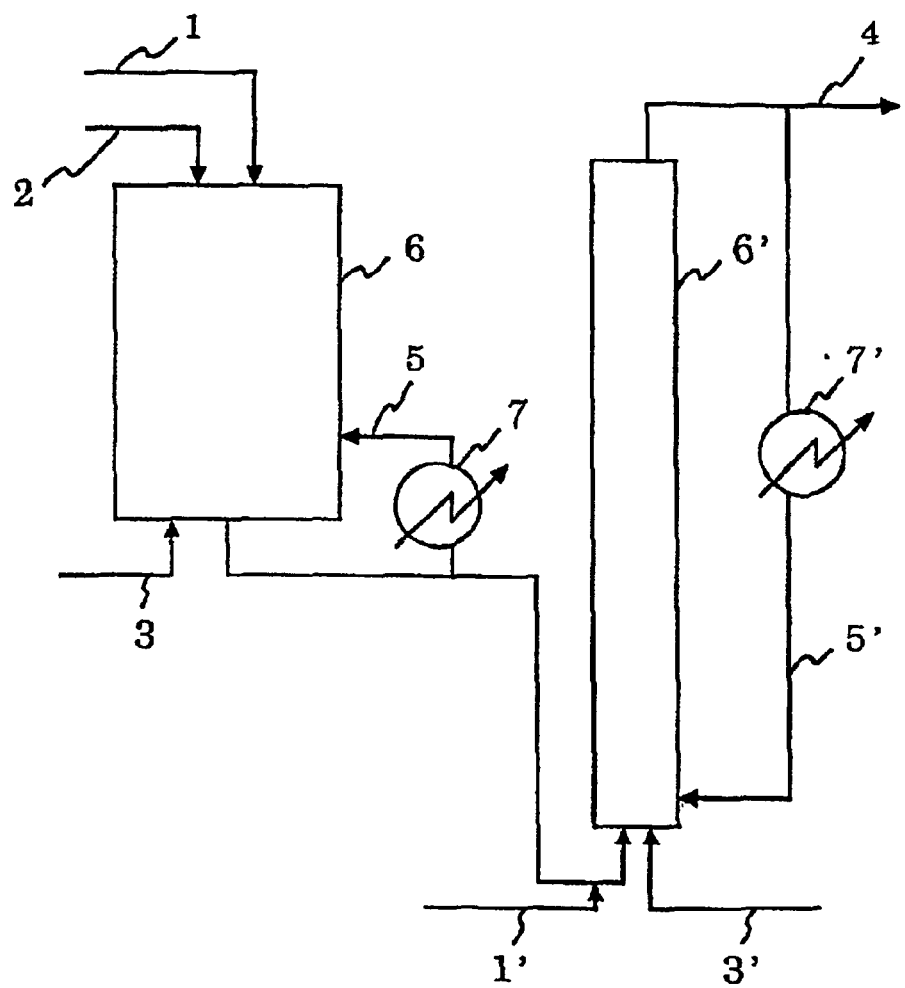
FIG. 4 shows a schematic flow of one example of the present invention (Example 3).

The hydrogenated polymer solution being discharged from the first reactor was supplied to the second reactor from the bottom, and at the same time a polymer solution hydrogenated in the second reactor was discharged from the top at a flow rate of about 760 ml/min (about 108 g/min in terms of the polymer containing olefinic unsaturated groups) and one part thereof was recycled to the second reactor at the lower portion thereof. The recycling amount was controlled so that the mass ratio (Polymer C to be supplied to the reactor)/(the hydrogenated polymer to be recycled) was 1/3. In the above operation, the hydrogenated polymer solution discharged from the first reactor was supplied to the second reactor after being mixed with the solution of Hydrogenation Catalyst II added thereto at a flow rate such that controls the Ti amount to be about 8 μmol/min. The reaction temperature was controlled by passing the hydrogenated polymer solution to be recycled through a heat exchanger to cool down or, if necessary, heat up so as to keep the reactor temperature 90° C. The hydrogen was supplied to the second reactor from the bottom so that the pressure in the reactor was 1.5 MPa. The schematic flow of this process is shown in FIG. 4.

The hydrogenated polymer solution discharged from the second reactor was supplied to a deairing tank to deaerate the hydrogen contained therein to prepare a hydrogenated polymer.

The above-mentioned continuous hydrogenation was continued for about 10 hours. The degrees of hydrogenation of the polymer hydrogenated in the first and second reactors were extremely steady, that is, maintained from 85 to 95% and 98% or more, respectively, throughout the continuous hydrogenation reaction.

Example 4
Continuous Hydrogenation Process 10.5 liters of Polymer D solution comprising 1,576 g of the polymer containing olefinic unsaturated groups was charged in a tank reactor equipped with a stirrer, which had an inner volume of 15 liters and an L/D of 3, and the temperature was increased to 70° C. After the inside of the reactor was substituted with hydrogen, the pressure in the reactor was increased to about 1 MPa (a gage pressure) in terms of hydrogen. While stirring, the solution of Hydrogenation Catalyst II was supplied to the reactor so that the Ti amount be 1.64 mmol, and hydrogen was supplied to the reactor over 1 hour so that the pressure in the reactor be 1 MPa. When a small amount of the resultant polymer was sampled, the degree of hydrogenation of olefinic unsaturated groups derived from butadiene was found to be 98%.

Subsequently, the continuous hydrogenation reaction by three reactors connected in series was conducted using the above-mentioned reactor as a first reactor, a tank reactor equipped with a stirrer which had an inner volume of 15 liters and an L/D of 3 as a second reactor, and a tube reactor having an inner volume of 10 liters and an L/D of 15 as a third reactor.

Firstly, the Polymer D solution and the solution of Hydrogenation Catalyst II were supplied to the first reactor from the top at a flow rate of about 180 ml/min (about 27 g/min in terms of the polymer containing olefinic unsaturated groups) and at a flow amount such that controls the Ti amount to be about 12 μmol/min, respectively. At the same time, the solution of the hydrogenated polymer was discharged from the bottom of the reactor at a flow rate of about 1.8 liters/min (about 270 g/min in terms of the polymer containing olefinic unsaturated groups) and one part thereof was recycled to the first reactor at the position L/8 above the lower tangent line thereof. The recycling amount was controlled so that the mass ratio (Polymer D to be supplied to the reactor)/(the hydrogenated polymer to be recycled) was 1/9. The solution amount to be discharged from the bottom of the first reactor was controlled so that the amount of the solution in the first reactor was controlled to be about 10 liters. The hydrogenation temperature was controlled by passing the hydrogenated polymer solution to be recycled through a heat exchanger to cool down or, if necessary, heat up so as to keep the first reactor temperature 110° C. The hydrogen was supplied to the first reactor from the bottom so that the pressure in the reactor be 1 MPa.

The hydrogenated polymer solution discharged from the first reactor was supplied to the second reactor from the top, and at the same time a polymer solution hydrogenated in the second reactor was discharged from the bottom thereof at a flow rate of about 760 ml/min (about 108 g/min in terms of the polymer containing olefinic unsaturated group) and one part thereof was recycled to the second reactor at the position L/8 above the lower tangent line thereof. The recycling amount was controlled so that the mass ratio (Polymer D to be supplied to the reactor)/(the hydrogenated polymer to be recycled) was 1/3. The amount of the hydrogenated polymer solution to be discharged from the bottom of the second reactor was controlled so that the amount of the solution in the second reactor be kept about 10 liters. In the above operation, the hydrogenated polymer solution discharged from the first reactor was supplied to the second reactor after being mixed with the solution of Hydrogenation Catalyst II which was added thereto at a flow rate such that controls the Ti amount to be about 6 μmol/min. The reaction temperature was controlled by passing the hydrogenated polymer solution to be recycled through a heat exchanger to cool down or, if necessary, heat up so as to keep the second reactor temperature 110° C. The hydrogen was supplied to the second reactor from the bottom so that the pressure in the reactor be 1 MPa.

Figure 5:
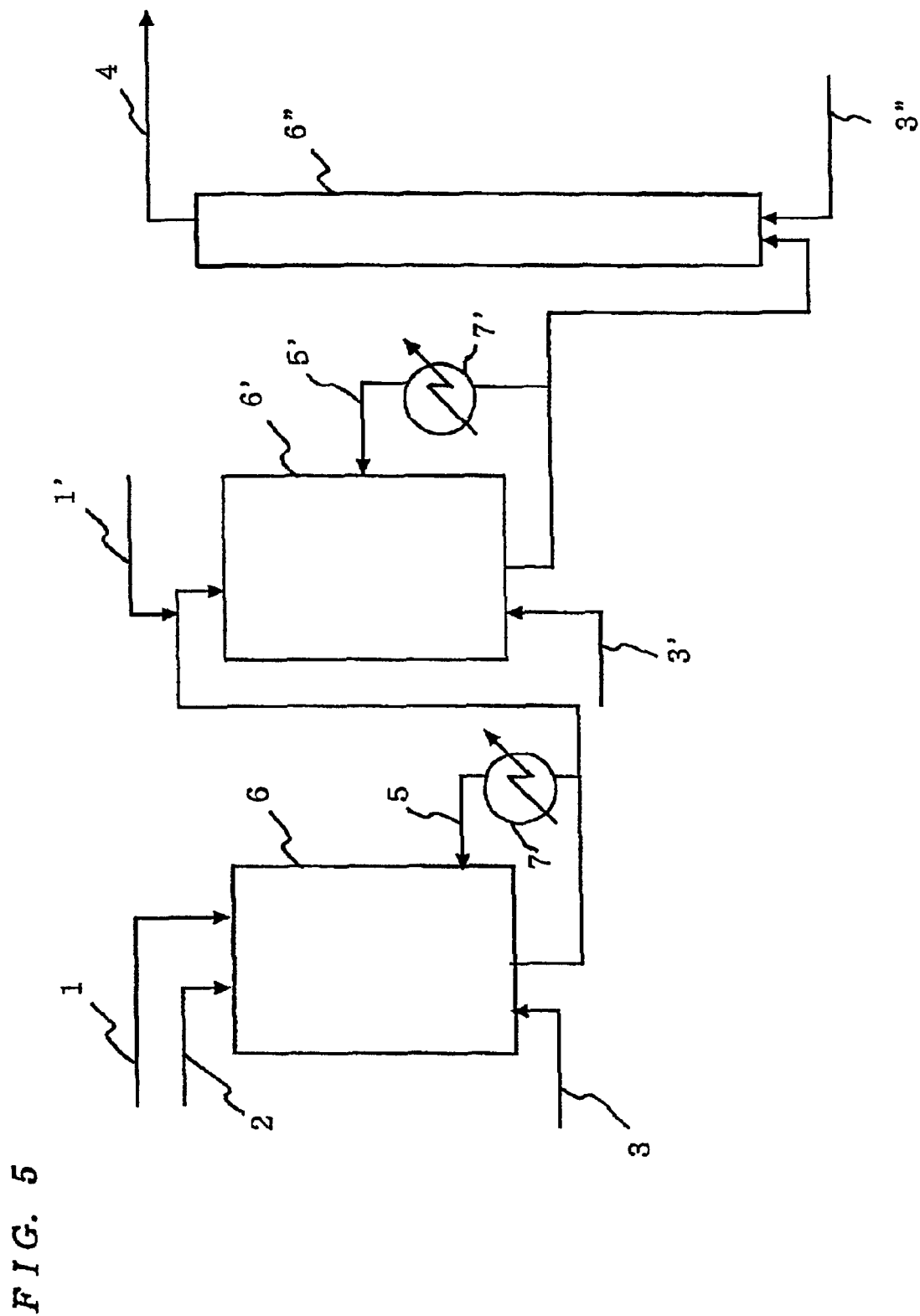
FIG. 5 shows a schematic flow of one example of the present invention (Example 4).

The hydrogenated polymer solution discharged from the second reactor was supplied to the third reactor from the bottom, and at the same time a hydrogenated polymer solution therein was discharged from the top of the third reactor at a flow rate of about 180 ml/min (about 27 g/min in terms of the polymer containing olefinic unsaturated groups). The hydrogenation reaction temperature was controlled by the jacket attached to the third reactor so as to keep the reactor temperature 110° C. The hydrogen was supplied to the third reactor from the bottom so that the pressure in the reactor be kept 1 MPa. The schematic flow of this process is shown in FIG. 5.

The hydrogenated polymer solution being discharged from the third reactor was supplied to a deairing tank to deaerate the hydrogen contained therein to prepare the hydrogenated polymer.

The above-mentioned continuous hydrogenation was continued for about 10 hours. The degrees of hydrogenation of the polymer hydrogenated in the first, second, and third reactors were extremely steady, that is, maintained from 75 to 85%, from 90 to 95%, and 98% or more, respectively, throughout the continuous hydrogenation reaction.

Example 5

Continuous Hydrogenation Process 10.5 liters of Polymer H solution comprising 1,386 g of the polymer containing olefinic unsaturated groups was charged in a tank reactor equipped with a stirrer, which had an inner volume of 15 liters and an L/D of 3, and the temperature was increased to 70° C. After the inside of the reactor was substituted with hydrogen, the pressure in the reactor was increased to about 1 MPa (a gage pressure) in terms of hydrogen. While stirring, the solution of Hydrogenation Catalyst II was supplied to the reactor so that the Ti amount be 1.64 mmol, and hydrogen was supplied to the reactor over 1 hour so that hydrogen pressure be 1 MPa. When a small amount of the resultant polymer was sampled, the degree of hydrogenation of olefinic unsaturated groups derived from butadiene was found to be 98%.

Subsequently, the continuous hydrogenation reaction by two reactors connected in series was conducted using the above-mentioned reactor as a first reactor and a tube reactor having an inner volume of 10 liters and an L/D of 15 as a second reactor. In the tube reactor, a static mixer was arranged.

Firstly, while continuously polymerizing Polymer H, the solution of polymerized Polymer H and the solution of Hydrogenation Catalyst II were supplied to the first reactor from the top at a flow rate of about 200 ml/min (about 26 g/min in terms of the polymer containing olefinic unsaturated groups) and at a flow rate such that controls the Ti amount to be about 12 μmol/min, respectively. And, the solution of the hydrogenated polymer was discharged from the bottom of the first reactor at a flow rate of about 3.2 liters/min (about 422 g/min in terms of the polymer containing olefinic unsaturated groups), and then one part thereof was recycled to the first reactor at the position L/8 above the lower tangent line thereof. The recycling amount was controlled so that the mass ratio (Polymer H to be supplied to the reactor)/(the hydrogenated polymer to be recycled) was 1/15. The solution amount to be discharged from the bottom of the first reactor was controlled so that the amount of solution in the first reactor be kept about 10 liters. The hydrogenation temperature was controlled by passing the hydrogenated polymer solution to be recycled through a heat exchanger to cool down or, if necessary, heat up so as to keep the reactor temperature 90° C. The hydrogen was supplied to the first reactor from the bottom so that the pressure in the reactor be 1 MPa.

Figure 6:
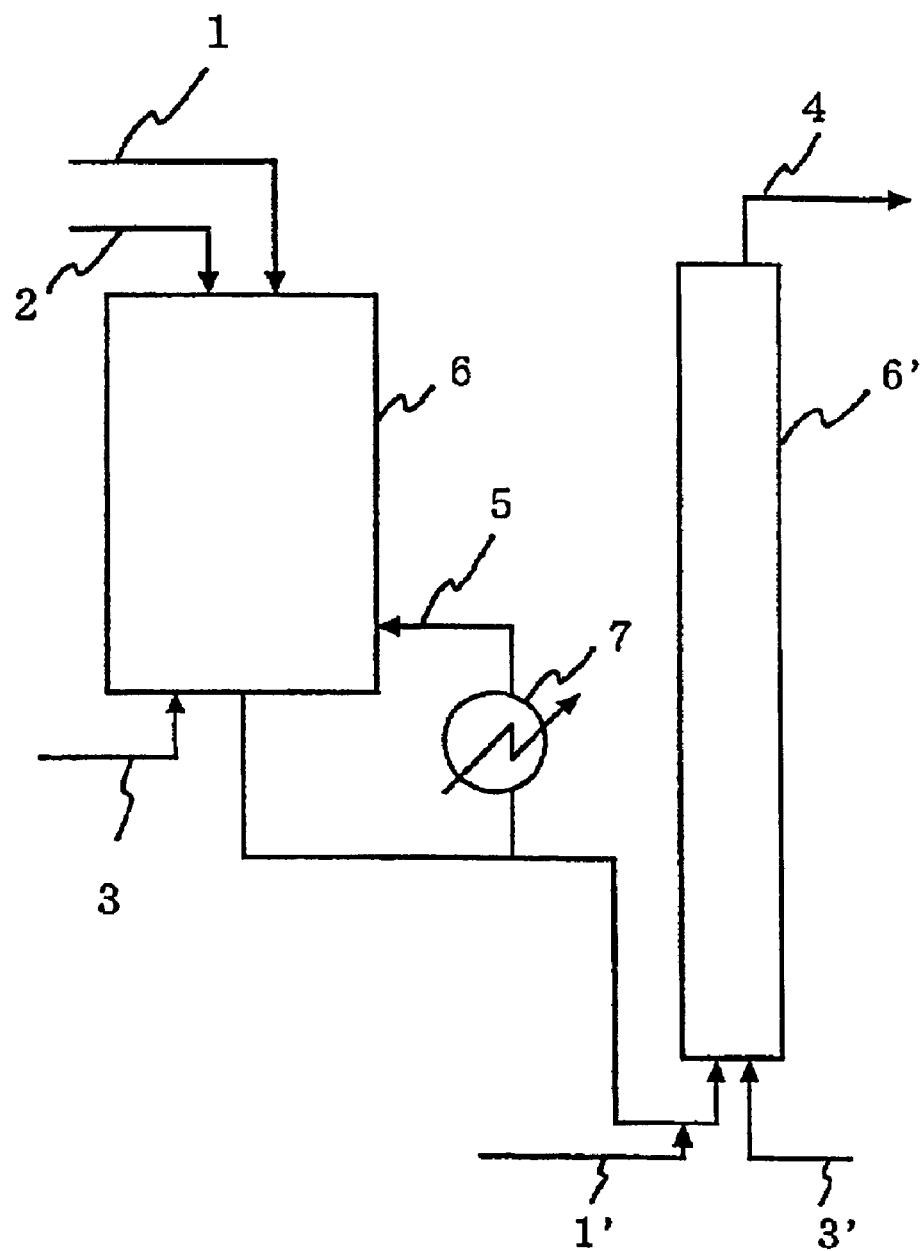
FIG. 6 shows a schematic flow of one example of the present invention (Example 5).

The hydrogenated polymer solution being discharged from the first reactor was supplied to the second reactor from the bottom. In the above-mentioned operation, the hydrogenated polymer solution being discharged from the first reactor was supplied to the second reactor after being mixed with the solution of Hydrogenation Catalyst II which was added thereto at a flow amount such that controls the Ti amount to be about 6 μmol/min. The temperature of the hydrogenation reaction was controlled by the jacket attached to the second reactor so as to keep the reactor temperature 90° C. The hydrogen was supplied to the second reactor from the bottom so that the pressure in the reactor be 1 MPa. The schematic flow of this process is shown in FIG. 6.

The hydrogenated polymer solution being discharged from the second reactor was supplied to a deairing tank to deaerate the hydrogen contained therein to prepare a hydrogenated polymer.

The above-mentioned continuous hydrogenation was continued over about 10 hours. The degrees of hydrogenation of the polymer hydrogenated in the first and second reactors were extremely steady, that is, maintained from 85 to 95% and 98% or more respectively throughout the continuous hydrogenation reaction.

Example 6
Continuous Hydrogenation Process

According to the following process, a hydrogenated polymer, the degree of hydrogenation of which was controlled about 40%, was continuously prepared.

Firstly, 10.5 liters of Polymer I solution comprising 1,244 g of the polymer containing olefinic unsaturated groups was charged in a tank reactor equipped with a stirrer, which had an inner volume of 15 liters and an L/D of 3, and the temperature was increased to 70° C. After the inside of the reactor was substituted with hydrogen, the pressure in the reactor was increased to about 1 MPa (a gage pressure) in terms of hydrogen. While stirring, the solution of Hydrogenation Catalyst I was supplied to the reactor so that the Ti amount be 0.66 mmol, and hydrogen was supplied so that the degree of hydrogenation of olefinic unsaturated groups derived from butadiene be about 40% to conduct a hydrogenation reaction.

Subsequently, the Polymer I solution and the solution of Hydrogenation Catalyst I were supplied to the above-mentioned reactor from the top at a flow rate of about 200 ml/min (about 24 g/min in terms of the polymer containing olefinic unsaturated groups) and at a flow rate such that controls the Ti amount to be about 12 µmol, respectively. While, the solution of hydrogenated polymer was discharged from the bottom of the reactor at a flow amount of about 220 ml/min (about 26 g/min in terms of the polymer containing olefinic unsaturated groups), and then one part thereof was recycled to the reactor at the position L/4 above the lower tangent line thereof. The recycling amount was controlled so that the mass ratio (Polymer I to be supplied to the reactor)/(the hydrogenated polymer to be recycled) was 10/1. The solution amount to be discharged from the bottom of the reactor was controlled so as to keep the amount of solution in the reactor about 10 liters. The hydrogenation temperature was controlled by passing the hydrogenated polymer solution to be recycled through a heat exchanger to cool down or, if necessary, heat up so as to keep the reactor temperature 90° C. The amount of hydrogen to be supplied to the reactor from the bottom was about 40% of that necessary to completely hydrogenate the olefinic unsaturated groups of the Polymer I to be supplied to the continuous hydrogenation reactor, i.e., at a flow rate of 0.178 mol/min. The pressure of the continuous hydrogenation reactor was about from 0.5 to 1 MPa. The schematic flow of this process is shown in FIG. 1.

The hydrogenated polymer solution being discharged from the reactor was supplied to a deairing tank to deaerate the hydrogen contained therein to prepare a hydrogenated polymer.

The above-mentioned continuous hydrogenation was continued for about 10 hours. The degrees of hydrogenation of the hydrogenated polymer which was obtained during this method was extremely steady, that is, maintained from 35 to 45% throughout the continuous hydrogenation reaction.

Example 7
Continuous Hydrogenation Process

According to the following process, a hydrogenated polymer, the degree of hydrogenation of which was controlled about 55%, was continuously prepared.

The continuous hydrogenation reaction was conducted in the same manner as in Example 2 except that Polymer E was used instead of Polymer B and the total amount of hydrogen added was about 55% of that necessary to completely hydrogenate the olefinic unsaturated groups of the Polymer E to be supplied to the continuous hydrogenation reactor, i.e., at a flow rate of 0.046 mol/min. The pressure of the continuous hydrogenation reactor was about from 0.5 to 1 MPa.

The above-mentioned continuous hydrogenation was continued for about 10 hours. The degree of hydrogenation of the polymer being hydrogenated in the first and second reactors was extremely steady, that is, maintained from 28 to 38% and from 50 to 60%, respectively, throughout the continuous hydrogenation reaction.

Example 8
Continuous Hydrogenation Process

The continuous hydrogenation reaction was conducted for about 10 hours in the same manner as in Example 3 except that Polymer F was used instead of Polymer C. The degree of the hydrogenation of polymer being hydrogenated in the first reactor and second reactor was extremely steady, that is, maintained from 85 to 95% and 98% or more, respectively, throughout the continuous hydrogenation reaction.

Example 9
Continuous Hydrogenation Process

The continuous hydrogenation reaction was conducted for about 10 hours in the same manner as in Example 2 except that Polymer G and Hydrogenation Catalyst III were used instead of Polymer B and Hydrogenation Catalyst I, respectively. The degrees of hydrogenation of the polymer hydrogenated in the first and second reactors were extremely steady, that is, maintained from 80 to 93% and 97% or more, respectively, throughout the continuous hydrogenation reaction.

Example 10
Continuous Hydrogenation Process

According to the following process, the hydrogenated polymer, the degree of hydrogenation of which was controlled to be about 70%, was continuously prepared.

The continuous hydrogenation reaction was conducted in the same manner as in Example 1 except that the amount of hydrogen added was about 70% of that necessary to completely hydrogenate the olefinic unsaturated groups of the Polymer A (0.187 mol/min) and the recycling amount was controlled so that the mass ratio (Polymer A to be supplied to the reactor)/(the hydrogenated polymer to be recycled) be 1/15. The pressure of the continuous hydrogenation reactor was about from 0.5 to 1 MPa.

The above-mentioned continuous hydrogenation was continued for about 10 hours. The degrees of hydrogenation of the polymer hydrogenated were extremely steady, that is, maintained from 65 to 75% throughout the continuous hydrogenation reaction.

Example 11
Continuous Hydrogenation Process

Figure 7:
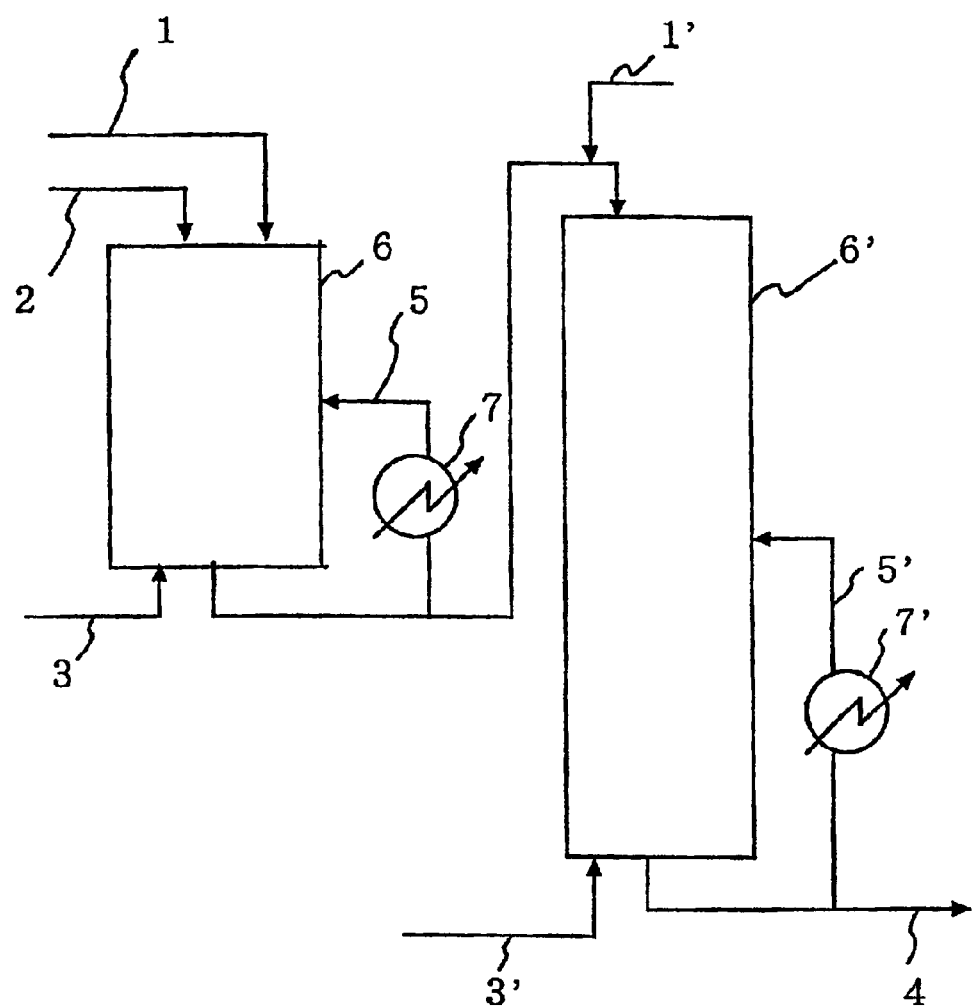
FIG. 7 shows a schematic flow of one example of the present invention (Example 11).

In the continuous hydrogenation reaction in Example 2, the flow rate of the hydrogenated polymer solution to be discharged from the bottom of the first reactor was changed to about 2.2 liters/min and one part thereof was recycled to the first reactor from the top. The recycling amount was controlled so that the mass ratio (Polymer B to be supplied to the first reactor)/(the hydrogenated polymer to be recycled) was 1/10. Further, one part of the hydrogenated polymer solution discharged from the second reactor was recycled to the second reactor at the position of L/2 above the lower tangent line thereof at a flow rate of about 100 ml/min, i.e., at a mass ratio (Polymer B to be supplied to the first reactor)/(the hydrogenated polymer to be recycled) of 1/1. The continuous hydrogenation reaction was conducted in the same manner as in Example 2 except for the above. The schematic flow of this process is shown in FIG. 7.

The above-mentioned continuous hydrogenation was continued for about 10 hours. The degrees of hydrogenation of the polymer being hydrogenated were extremely steady, that is, maintained 98% or more throughout the continuous hydrogenation reaction.

Example 12
Batch Hydrogenation Process

Ethyl alcohol was added in an amount 0.9 times as large as the mole number of n-butyllithium, i.e., in an amount of 10.1 moles, to the Polymer J for a pre-treatment and then the whole amount of the resultant polymer solution was transferred to a tank reactor equipped with a stirrer and having an inner volume of 20 m$^3$ and an L/D of 3. Further, to the reactor was added the cyclohexane refined and dried to prepare a 12 wt % cyclohexane solution, and then the initial temperature in the reactor was set at 80° C. under stirring. Subsequently, the polymer solution was discharged from the bottom of the reactor and the total amount thereof was recycled at a flow rate of 150 m$^3$/hr through a recycling line (equipped with a heat exchanger), which could recycle the discharged solution to the reactor at the position of L/8 above the lower tangent line thereof. This recycling operation was continued until the reaction completed. The inside of the reactor was substituted with hydrogen gas and pressurized to be a hydrogen pressure of 0.7 MPa. To the polymer solution was added Hydrogenation Catalyst V (TPM/Li) so that the mass ratio of Ti to the polymer be 20 wt ppm (corresponding to 0.55 moles of Ti) to start the hydrogenation. Two minutes later from the initiation of the hydrogenation reaction, the absorption rate of hydrogen became stable and reached 7.2 Nm$^3$/min. Herein, the term "Nm$^3$" represents a volume under the normal conditions (the same applied to the below). At the time when the absorption rate of hydrogen decreased to 5.0 Nm$^3$/min, 70% of the initial rate, 20 wt ppm of the catalyst (corresponding to 0.55 moles of Ti) was additionally supplied. The degree of hydrogenation of the polymer at this time was 85.4% based on the consumption of the hydrogen gas. The hydrogenation reaction was further continued. The degree of hydrogenation of the polymer based on the consumption of the hydrogen gas reached 100% and the absorption of hydrogen to the polymer solution was stopped. Consequently, the hydrogenation reaction was stopped. The degree of hydrogenation of the polymer measured by the NMR method was 99.7%. The highest temperature during the hydrogenation was 92° C. and the reaction time was 42 minutes.

Comparative Example 2
Batch Hydrogenation Process

The hydrogenation reaction was conducted in the same manner as in Example 12 except that the recycle line was not used. The degree of hydrogenation of the polymer at the time of additional supply was 72.4% based on the consumption of the hydrogen gas. Even at the point where it had been 1 hour since the initiation of the reaction, the degree of hydrogenation of the polymer based on the consumption of the hydrogen gas was 88.1%, and the reaction did not make any further progress. The reaction heat was generated in a too considerable amount to reduce sufficiently. The highest temperature during the hydrogenation reaction reached to 123° C.

Example 13
Batch Hydrogenation Process

Ethyl alcohol was added in an amount 0.9 times as large as the mole number of n-butyllithium, i.e., in an amount of 10.1 moles, to the Polymer J for a pre-treatment and then the whole amount of the resultant polymer solution was transferred to a tank reactor equipped with a stirrer and having an inner volume of 20 m$^3$ and an L/D of 3. Further, to the reactor was added the cyclohexane refined and dried to prepare a 12 wt % cyclohexane solution, and then the initial temperature in the reactor was set at 80° C. under stirring. Subsequently, the polymer solution was discharged from the bottom of the reactor and the total amount thereof was recycled at a flow rate of 150 m$^3$/hr through a recycling line (equipped with a heat exchanger), which could recycle the discharged solution to the reactor at the position of L/8 above the lower tangent line thereof. This recycling operation was continued until the reaction completed. The inside of the reactor was substituted with hydrogen gas and pressurized to be a hydrogen pressure of 0.7 MPa. To the polymer solution was added Hydrogenation Catalyst V (TPM/Li) so that the mass ratio of Ti to the polymer be 15 wt ppm (corresponding to 0.41 moles of Ti) to start the hydrogenation. Two minutes later from the initiation of the hydrogenation reaction, the absorption rate of hydrogen became stable and reached 5.8 Nm$^3$/min.

At the time when the absorption rate of hydrogen decreased to 70% of the initial rate, i.e., at a flow rate of 4.1 Nm$^3$/min, 10 wt ppm of the catalyst (corresponding to 0.28 moles of Ti) was additionally supplied. The degree of hydrogenation of the polymer at this time was 80.1% based on the consumption of the hydrogen gas. Again, the absorption rate decreased to 70% of the initial rate, i.e., at a flow rate of 4.1 Nm$^3$/min, 5 wt ppm of the catalyst (corresponding to 0.14 moles of Ti) was additionally supplied. The degree of hydrogenation of the polymer based on the consumption of the hydrogen gas at this time was 94.5%. The hydrogenation reaction was further continued. The degree of hydrogenation of the polymer based on the consumption of the hydrogen gas reached 100% and the absorption of hydrogen to the polymer solution was stopped. Consequently, the hydrogenation reaction was stopped. The degree of hydrogenation of the polymer measured by the NMR method was 99.9%. The highest temperature during the hydrogenation was 90° C. and the reaction time was 39 minutes.

Example 14
Batch Hydrogenation Process

Trimethylchlorosilane was added in an amount 0.9 times as large as the mole number of n-butyllithium, i.e., in an amount of 35.8 moles, to the Polymer K for a pre-treatment and then the whole amount of the resultant polymer solution was transferred to a tank reactor equipped with a stirrer and having an inner volume of 20 m$^3$ and an L/D of 3. Further, to the reactor equipped with a stirrer was added the cyclohexane refined and dried to prepare a 17 wt % cyclohexane solution and then the initial temperature in the reactor was set at 80° C. while stirring. Subsequently, the polymer solution was discharged from the bottom of the reactor and the total amount thereof was recycled at a flow rate of 150 m$^3$/hr through a recycling line (equipped with a heat exchanger), which could recycle the discharged solution to the reactor at the position of L/8 above the lower tangent line thereof. This recycling operation was continued until the reaction completed. The inside of the reactor was substituted with hydrogen gas and pressurized to be a hydrogen pressure of 0.7 MPa. To the polymer solution in the reactor was added Hydrogenation Catalyst IV (Tebbe reagent) so that the mass ratio of Ti to the polymer be 12 wt ppm (corresponding to 0.44 moles of Ti) to start the hydrogenation. Two minutes later from the initiation of the hydrogenation reaction, the absorption rate of hydrogen became stable and reached 6.3 Nm$^3$/min. At the time when the absorption rate of hydrogen decreased to 3.2 Nm$^3$/min, 50% of the initial rate, 5 wt ppm of the catalyst (Hydrogenation Catalyst IV) (corresponding to 0.18 moles of Ti) was additionally supplied. The degree of hydrogenation of the polymer at this time was 82.0% based on the consumption of the hydrogen gas. Again, the absorption rate reached decreased to 3.2 Nm$^3$/min, 50% of the initial rate, and 5 wt ppm of the catalyst (Hydrogenation Catalyst IV)(corresponding to 0.18 moles of Ti) was additionally supplied. The degree of hydrogenation of the polymer based on the consumption of the hydrogen gas at this time was 91.1%. Further, at the time when the absorption rate reached decreased to 3.2 Nm$^3$/min, 50% of the initial rate, 3 wt ppm of the catalyst (Hydrogenation Catalyst IV)(corresponding to 0.11 moles of Ti) was additionally supplied. The degree of hydrogenation of the polymer based on the consumption of the hydrogen gas at this time was 97.5%. The hydrogenation reaction was further continued. The degree of hydrogenation of the polymer based on the consumption of the hydrogen gas reached 100% and the absorption of hydrogen to the polymer solution was stopped. Consequently, the hydrogenation reaction was stopped. The degree of hydrogenation of the polymer measured by the NMR method was 100%. The highest temperature during the hydrogenation was 90° C. and the reaction time was 38 minutes.

Industrial Applicability

According to the present invention, a hydrogenated polymer having a desirable degree of hydrogenation can be steadily obtained for a long term in a process wherein a polymer containing a olefinic unsaturated group is contacted with hydrogen to hydrogenate the olefinic unsaturated group. As a result, the amount of the catalyst to be used can be decreased more sufficiently than in the conventional process.

The hydrogenated polymer prepared according to the process of the present invention can be used as it is or as a composition incorporating various additives, for various molded articles such as injection molded, blow molded, compression molded, vacuum formed or extrusion molded articles in the shape of a sheet, a film or the like, or molded articles in the shape of non-woven cloth or fibers, or the like. These molded articles can be used for food packaging materials, materials for medical device, home electric appliances and parts thereof, materials for automobile parts, industrial parts, utensils, toys or the like, footwear materials, materials for adhesive or bonding agents, asphalt modifier or the like.

What is claimed is:

1. A process for hydrogenating a polymer, which process comprises the steps of:
   contacting a polymer solution containing an olefinic unsaturated group with hydrogen in the presence of a hydrogenation catalyst to hydrogenate the olefinic unsaturated group of the polymer; and
   recycling at least one part of the resultant hydrogenated polymer solution for hydrogenation.

2. The process according to claim 1, wherein the polymer solution containing an olefinic unsaturated group is continuously supplied to a reactor to continuously hydrogenate the olefinic unsaturated group of the polymer, and the resultant hydrogenated polymer solution is continuously taken out from the reactor and then one part thereof is continuously recycled to the reactor for hydrogenation.

3. The process according to claim 2, wherein the hydrogen is supplied from near the bottom of the reactor.

4. The process according to claim 2, wherein the reactor is a tank reactor, the polymer solution containing an olefinic unsaturated group is supplied from near the top of the reactor, and the resultant hydrogenated polymer solution is taken out from near the bottom of the reactor or a piping arranged out of the reactor to recycle one part thereof to the reactor for hydrogenation.

5. The process according to claim 2, wherein the reactor is a tank reactor having an L/D of from 1 to 8 and being equipped with a stirrer wherein L represents a length between an upper tangent line and a lower tangent line of the reactor and D represents an inner diameter of the reactor.

6. The process according to claim 2, wherein the reactor is a column or tube reactor, and the polymer solution containing an olefinic unsaturated group is supplied from near the bottom of the reactor, and one part of the polymer solution hydrogenated in the reactor is continuously taken out from near the top of the reactor or a piping arranged out of the reactor to recycle one part thereof to the reactor.

7. The process according to claim 1, wherein the hydrogenation catalyst is supplied two or more times to conduct hydrogenation.

8. The process according to claim 1, wherein a reactor group comprising two or more reactors connected in series is used, the polymer solution containing an olefinic unsaturated group is continuously supplied to the first reactor of the reactor group, the hydrogen is supplied to at least one reactor of the reactor group to continuously hydrogenate the olefinic unsaturated group of the polymer, and the resultant polymer solution hydrogenated in at least one reactor of the reactor group is continuously taken out to continuously recycle one part thereof to the reactor and/or a reactor arranged upstream of the reactor for hydrogenation.

9. The process according to claim 8, wherein the hydrogen is supplied from near the bottom of at least one reactor of the reactor group.

10. The process according to claim 8, wherein the first reactor is a tank reactor having an L/D of from 1 to 8 and being equipped with a stirrer, and the second and following reactors arranged downstream of the first reactor is a tank reactor having an L/D of from 1 to 8 and being equipped with a stirrer.

11. The process according to claim 8, wherein the hydrogen catalyst is supplied to the first reactor and is additionally supplied to at least one of the reactors arranged downstream of the first reactor.

12. The process according to claim 2 or 8, wherein the continuous hydrogenation is initiated after the polymer solution containing an olefinic unsaturated group is hydrogenated to a desirable degree of hydrogenation.

13. The process according to any one of claims 1 through 11, wherein a mass ratio between a polymer containing an olefinic unsaturated group to be supplied and the resultant hydrogenated polymer to be recycled is from 1/50 to 50/1.

14. The process according to claim 1, wherein a hydrogenation reaction is a batch type.

15. The process according to claim 14, wherein the hydrogenation catalyst is supplied two or more times.

16. The process according to claim 15, wherein timing of the second and following supply of the hydrogenation catalyst is decided by measuring an absorption rate of hydrogen.

17. The process for according to claim 16, wherein timing of the second and following supply is a time when the absorption rate of hydrogen decreases to 80% or less of an initial absorption rate of hydrogen at the beginning of hydrogenation reaction.

18. The process according to claim 15, wherein an amount of the first supply of hydrogenation catalyst is controlled so that a degree of hydrogenation at the time of the second and following supply is from 50% to 90%.

19. The process according to any one of claims 1 through 11 and 14 through 18, wherein the resultant hydrogenated polymer solution is recycled through a heat exchanger.

20. The process according to any one of claims 1, 7, 11, and 15 through 18, wherein the hydrogenation catalyst is a metallocene compound.

* * * * *